(12) United States Patent
Katano et al.

(10) Patent No.: US 7,802,127 B2
(45) Date of Patent: Sep. 21, 2010

(54) METHOD AND COMPUTER SYSTEM FOR FAILOVER

(75) Inventors: Shingo Katano, Kawasaki (JP); Yoshifumi Takamoto, Kokubunji (JP); Keisuke Hatasaki, Kawasaki (JP)

(73) Assignee: Hitachi, Ltd., Tokyo (JP)

( * ) Notice: Subject to any disclaimer, the term of this patent is extended or adjusted under 35 U.S.C. 154(b) by 457 days.

(21) Appl. No.: 11/765,722

(22) Filed: Jun. 20, 2007

(65) Prior Publication Data

US 2008/0133963 A1 Jun. 5, 2008

(30) Foreign Application Priority Data

Dec. 4, 2006 (JP) ............... 2006-326446

(51) Int. Cl.
*G06F 11/00* (2006.01)
(52) U.S. Cl. .......................................... 714/3; 718/100
(58) Field of Classification Search .............. 714/47
See application file for complete search history.

(56) References Cited

U.S. PATENT DOCUMENTS

| | | | |
|---|---|---|---|
| 6,728,746 B1 * | 4/2004 | Murase et al. ................. 718/1 |
| 7,096,469 B1 * | 8/2006 | Kubala et al. ............... 718/100 |
| 7,178,059 B2 * | 2/2007 | Greenspan et al. ........... 714/13 |
| 7,240,234 B2 * | 7/2007 | Morita et al. ................ 714/4 |
| 7,549,076 B2 * | 6/2009 | Hatasaki et al. ............... 714/3 |
| 2003/0051187 A1 * | 3/2003 | Mashayekhi et al. ......... 714/4 |
| 2003/0217088 A1 * | 11/2003 | Takamoto ..................... 709/1 |
| 2006/0015773 A1 * | 1/2006 | Singh et al. .................. 714/13 |
| 2006/0143498 A1 | 6/2006 | Hatasaki et al. |
| 2006/0190760 A1 * | 8/2006 | Saika ............................ 714/4 |
| 2007/0011495 A1 * | 1/2007 | Armstrong et al. .......... 714/39 |

FOREIGN PATENT DOCUMENTS

JP 04-141744 5/1992

* cited by examiner

*Primary Examiner*—Scott T Baderman
*Assistant Examiner*—Kamini Patel
(74) *Attorney, Agent, or Firm*—Brundidge & Stanger, P.C.

(57) ABSTRACT

In a computer system wherein plural servers are connected with an external disk device via a network, each server incorporates therein a logic partition module for configuring at least one logic partition in the server, and the operating system stored in the logic partition is booted by the boot disk of an external disk device, the failover operation is performed only for the logic partition affected by a failure when the task being executed by a working server is taken over by another server at the time of the failure occurring in the working server.

16 Claims, 18 Drawing Sheets

FIG.4

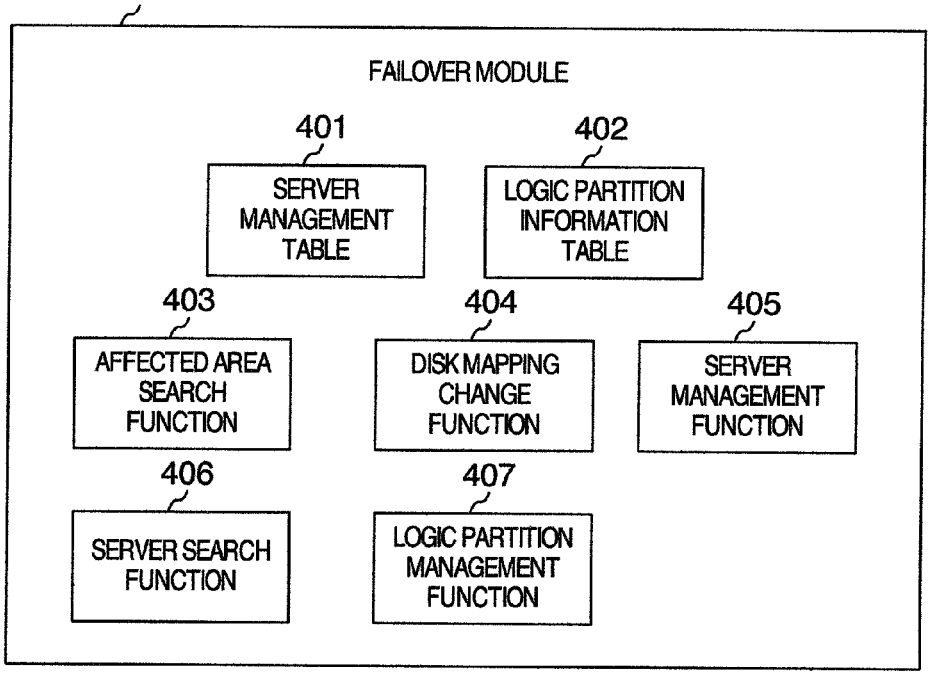

FIG.5

SERVER MANAGEMENT TABLE

| SERVER IDENTIFIER | CPU INFORMATION | | | MEMORY INFORMATION | | | I/O DEVICE INFORMATION | | STATUS | FAILURE LOCATION |
|---|---|---|---|---|---|---|---|---|---|---|
| | NUMBER OF CPUS | CPU IDENTIFIER | TOTAL CAPACITY | MEMORY IDENTIFIER | CAPACITY | | NIC | HBA | | |
| S1 | 2 | CPU1 | 2GB | Mem1 | 1GB | | MAC1 | WWN1 | IN USE | – |
| | | CPU2 | | Mem2 | 1GB | | MAC2 | WWN2 | | |
| S2 | 4 | CPU3 | 16GB | Mem3 | 4GB | | MAC3 | WWN3 | IN USE | – |
| | | CPU4 | | Mem4 | 4GB | | MAC4 | WWN4 | | |
| | | CPU5 | | Mem5 | 4GB | | MAC5 | WWN5 | | |
| | | CPU6 | | Mem6 | 4GB | | MAC6 | WWN6 | | |
| S3 | 2 | CPU7 | 4GB | Mem7 | 1GB | | MAC7 | WWN7 | NOT IN USE | – |
| | | | | Mem8 | 1GB | | | | | |
| | | CPU8 | | Mem9 | 1GB | | MAC8 | WWN8 | | |
| | | | | Mem10 | 1GB | | | | | |
| S4 | 2 | CPU9 | 2GB | Mem11 | 1GB | | MAC9 | WWN9 | FAILURE | CPU10 |
| | | CPU10 | | Mem12 | 1GB | | MAC10 | WWN10 | | |

FIG.6

405 SERVER MANAGEMENT FUNCTION

601 FAILOVER OPERATION TABLE

| FAILURE TYPE (611) | OPERATION (612) |
|---|---|
| ABNORMAL TEMPERATURE | EXECUTE FAILOVER |
| CPU ERROR | EXECUTE FAILOVER |
| MEMORY ERROR | NONE |
| FAN STOPPED | NONE |
| POWER UNIT MALFUNCTION | EXECUTE FAILOVER |

FIG.7

LOGIC PARTITION INFORMATION TABLE

| SERVER IDENTIFIER (701) | LOGIC PARTITION MODULE IDENTIFIER (702) | LOGIC PARTITION IDENTIFIER (703) | NUMBER OF CPUS (704) | CPU IDENTIFIER (705) | MEMORY CAPACITY (706) | MEMORY IDENTIFYING INFORMATION (707) | I/O DEVICE NIC (781) | I/O DEVICE HBA (782) |
|---|---|---|---|---|---|---|---|---|
| S1 | P1 | LPAR1 | 1 | CPU1 | 1GB | Mem1 | MAC1 | WWN1 |
|  |  | LPAR2 | 1 | CPU2 | 1GB | Mem2 | MAC2 | WWN2 |
| S2 | P2 | LPAR3 | 2 | CPU3 CPU4 | 12GB | Mem3 Mem4 Mem5 | MAC3 MAC4 | WWN3 WWN4 |
|  |  | LPAR4 | 2 | CPU5 CPU6 | 4GB | Mem6 | MAC5 MAC6 | WWN5 WWN6 |
| S4 | P4 | LPAR9 | 1 | CPU11 | 1GB | Mem9 | MAC9 | WWN9 |
|  |  | LPAR10 | 1 | CPU12 | 1GB | Mem10 | MAC10 | WWN10 |

FIG.17

LOGIC PARTITION INFORMATION TABLE

| SERVER IDENTIFIER (1701) | LOGIC PARTITION MODULE IDENTIFIER (1702) | RELOCATION-DURING-EXECUTION TECHNIQUE (1709) | LOGIC PARTITION IDENTIFIER (1703) | NUMBER OF CPUS (1704) | CPU IDENTIFIER (1705) | MEMORY CAPACITY (1706) | MEMORY IDENTIFYING INFORMATION (1707) | I/O DEVICE NIC (1781) | I/O DEVICE HBA (1782) |
|---|---|---|---|---|---|---|---|---|---|
| S1 | P1 | SUPPORTED | LPAR1 | 1 | CPU1 | 1GB | Mem1 | MAC1 | WWN1 |
|    |    |           | LPAR2 | 1 | CPU2 | 1GB | Mem2 | MAC2 | WWN2 |
| S2 | P2 | SUPPORTED | LPAR3 | 2 | CPU3 CPU4 | 12GB | Mem3 Mem4 Mem5 | MAC3 MAC4 | WWN3 WWN4 |
|    |    |           | LPAR4 | 2 | CPU5 CPU6 | 4GB | Mem6 | MAC5 MAC6 | WWN5 WWN6 |
| S4 | P4 | NON-SUPPORTED | LPAR9 | 1 | CPU11 | 1GB | Mem9 | MAC9 | WWN9 |
|    |    |               | LPAR10 | 1 | CPU12 | 1GB | Mem10 | MAC10 | WWN10 |

FIG.20

LOGIC PARTITION INFORMATION TABLE

| SERVER IDENTIFIER (2001) | LOGIC PARTITION MODULE IDENTIFIER (2002) | LOGIC PARTITION IDENTIFIER (2003) | INFORMATION ON RELATED LOGIC PARTITIONS — SERVER IDENTIFIER (2091) | INFORMATION ON RELATED LOGIC PARTITIONS — LOGIC PARTITION IDENTIFIER (2092) | ... | I/O DEVICE NIC (2081) | I/O DEVICE HBA (2082) |
|---|---|---|---|---|---|---|---|
| S1 | P1 | LPAR1 | S2 | LPAR1 | .... | MAC1 | WWN1 |
|    |    | LPAR2 |    |       |      | MAC2 | WWN2 |
| S2 | P2 | LPAR1 | S1 | LPAR1 |      | MAC3 | WWN3 |
|    |    |       |    |       |      | MAC4 | WWN4 |
|    |    | LPAR2 | S4 S4 | LPAR1 LPAR2 |  | MAC5 | WWN5 |
|    |    |       |       |             |  | MAC6 | WWN6 |
| S4 | P4 | LPAR1 | S2 | LPAR2 |      | MAC9 | WWN9 |
|    |    | LPAR2 | S2 | LPAR2 |      | MAC10 | WWN10 |

METHOD AND COMPUTER SYSTEM FOR FAILOVER

INCORPORATION BY REFERENCE

The present application claims priority from Japanese application JP2006-326446 filed on Dec. 4, 2006, the content of which is hereby incorporated by reference into this application.

BACKGROUND OF THE INVENTION

This invention relates to a method for failover, used in a computer system comprising plural servers which are booted by an external disk device, and more particularly to a method for failover for use with a computer system having plural logic partitions wherein only specified logic partitions are subjected to failover.

In a system where plural servers are booted by the use of an external disk array device, the disk array device can be connected with plural servers via fiber channel or fiber channel switches and therefore the boot disk of a particular server connected with the disk array device can be referred to by other servers. In such a configuration, when a failure occurs in a working server executing a task, the task can be taken over by starting a standby server through using the boot disk of the working server. Further, in this configuration, since there is no need of providing a standby server to be paired up with a working server, it is possible to hand over a task from an arbitrary working server to an arbitrary standby server, resulting in a decrease in the cost for initial installation. (Refer to United States Patent Application Publication No.: US2006/0143498 A1)

As a method of reducing the cost for initial installation is also known a technique wherein plural tasks are integrated by dividing a single server into plural logic partitions. For example, plural CPUs, memories, I/O devices, etc. are partitioned and allocated to individual logic partitions. The cost for initial installation can be further reduced by combining these techniques.

The Japanese patent document, JP-A-04-141744, discloses a technique wherein only a faulty operating system in the working host (computer) is taken over by the corresponding operating system in the standby host (computer) in the hot standby state in the hot standby system for a virtual computer.

With the conventional technique disclosed in JP-A-04-141744, employing the hot standby procedure, the standby host computer must be in operation, synchronized with the faulty working host computer. This incurs a problem relating to operating cost. Moreover, JP-A-04-141744 mentions the failure in the operating system, but not that in the hardware. The correspondence between the hardware failure location and the logic partition in a server depends on the configuration of the logic partition. In some cases, a single hardware may be related to plural logic partitions. Conventionally, in case of failure in hardware, the whole server including the faulty hardware has been usually subjected to failover, irrespective of the configuration of the logic partition.

In a computer system wherein a server, whose OS is booted by using an external disk array device, is divided into plural logic partitions and more than one independent virtual server is operated in the single server, when a boot disk is handed over from the working server to the standby server in case of a server failure, plural virtual servers operating in the working server are shut down so that the influence due to the failure becomes very considerable. This leads to a problem that the availability of the system as a whole becomes low. For example, even when a failure occurs in a CPU allocated to a particular logic partition, the other logic partitions must also be shut down, with the result that availability is lowered.

SUMMARY OF THE INVENTION

This invention aims to solve such a problem associated with the conventional technique used in the system described above, and to augment the availability of the system during recovery from failure.

In a computer system wherein plural servers are connected to an external disk device through a network; each server incorporates therein a logic partition module for configuring in the server more than one logic partition; and each logic partition allows the boot disk of the external disk device to boot the operating system when a failure occurs in a server which is executing a task and therefore when the task is to be taken over by another server, only the logic partition affected by the failure is subjected to failover. Accordingly, this invention characteristically provides a method for failover comprising a step of detecting a failure occurring in a server; a step of specifying the location of the failure; a step of specifying the logic partition affected by the failure; a step of shutting down the faulty logic partition; a step of searching for a standby server to be used for failover in the computer system; a step of configuring in the standby server a logic partition equivalent to the faulty logic partition; a step of causing the thus configured logic partition to take over the boot disk associated with the logic partition affected by the failure; and a step of starting the thus configured logic partition.

Moreover, this invention characteristically provides a computer system wherein plural computers are connected via a network to an external disk device; each computer incorporates therein a logic partition module for configuring more than one logic partition in the computer; and at least one of the plural computers is provided with a failover module which, when a failure occurs in a computer that is executing a task, hands over the task from the faulty computer to another computer;

the computer provided with the failover module comprising a process unit for detecting such a failure and a process unit for specifying the location of such a failure; and the failover module comprising a process unit for specifying the logic partition that is affected by the failure, depending on the location of the failure, a process unit for shutting down the affected logic partition, a process unit for searching for a standby computer to which the task is handed over, a process unit for configuring in the standby computer a logic partition equivalent to the affected logic partition, a process unit for establishing the correspondence between the logic partition configured in the standby computer and the external disk device for booting the associated operating system, and a process unit for starting the thus configured logic partition.

Furthermore, this invention characteristically provides a failover method for use with a physical computer wherein each of the installed servers includes a logic partition module for configuring more than one logic partition therein; and the failover operation is performed by taking over the logic partition affected by a failure by another logic partition; the failover method comprising a step of detecting a failure occurring in the server;

a step of specifying the location of the failure;

a step of specifying the logic partition that is affected by the failure, depending on the location of the failure;

a step of shutting down the affected logic partition;

a step of searching, among the servers, for a logic partition that is to take over the task having been executed by the affected logic partition;

a step of configuring a logic partition equivalent to the logic partition affected by the failure; and a step of causing the thus configured logic partition to take over and continuously execute, the original task.

Other objects, features and advantages of the invention will become apparent from the following description of the embodiments of the invention taken in conjunction with the accompanying drawings.

BRIEF DESCRIPTION OF THE DRAWINGS

FIG. 4 shows the structure of a failover module in a management server;

FIG. 5 shows a server management table;

FIG. 6 shows the structure of a server management function;

FIG. 7 shows a logic partition information table;

FIG. 17 shows a logic partition information table;

FIG. 20 shows a logic partition information table for a fourth embodiment of this invention;

DETAILED DESCRIPTION OF THE EMBODIMENTS

The embodiments of this invention will be described in the following.

Embodiment 1

Figure 1:
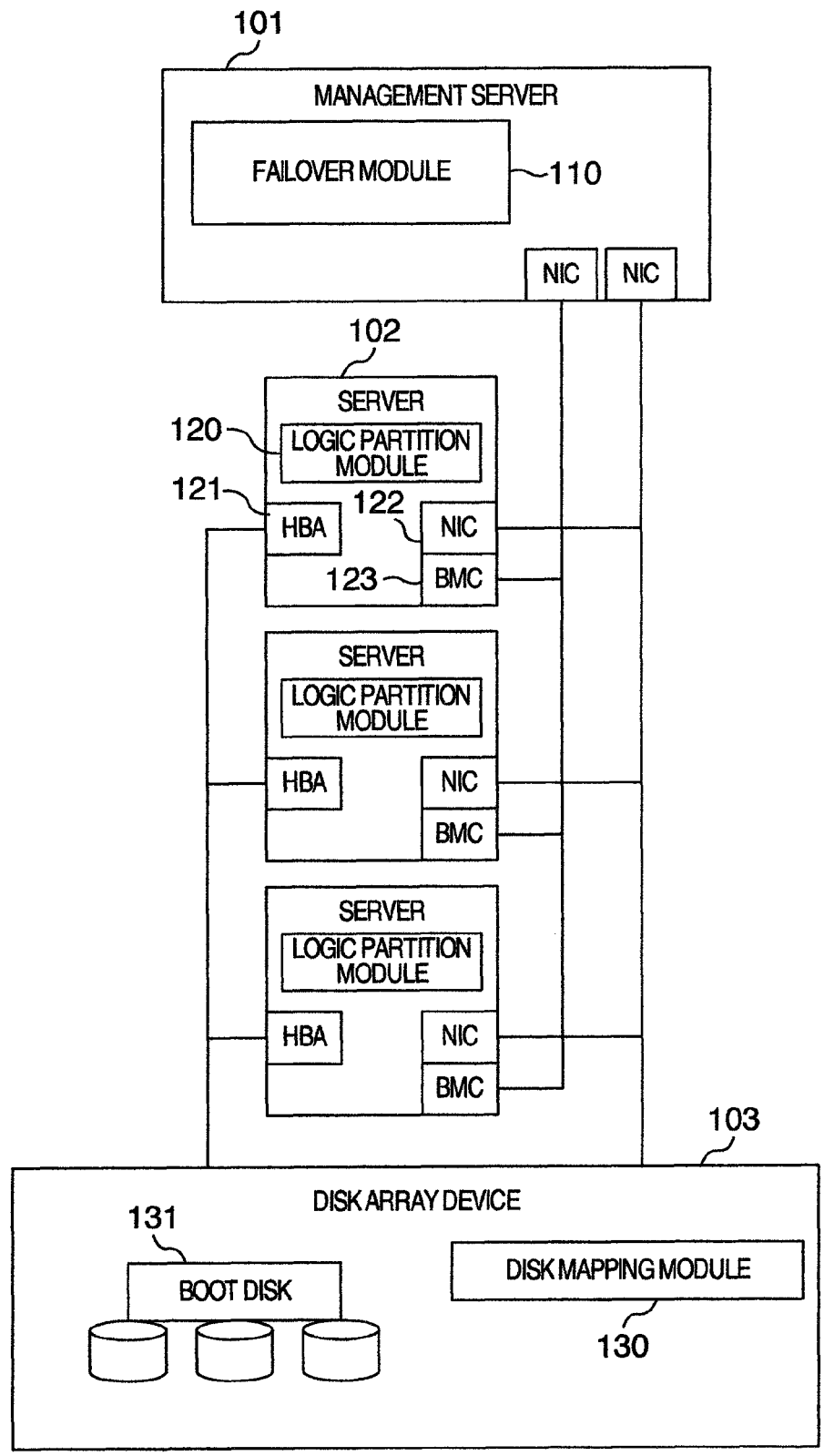
FIG. 1 is the overall view of the structure of an embodiment of this invention.

FIG. 1 is the overall view of the structure of a first embodiment of this invention. Plural servers 102 are connected via network interface cards (NICs) 122 with a network including a management server 101. The servers 102 are also connected via fiber channel host bus adapters (HBAs) 121 with a disk array device 103. As each server 102 incorporates therein a baseboard management controller (BMC) 123, the server 101 can monitor the status of the hardware of the server 102 and control the power source of the server 102, via the network. A logic partition module 120 is installed on each server 102, in which at least one logic partition can be configured. The management server 101 monitors the statuses of and, if necessary, controls, the servers 102 and the disk array device 103 via the network. The management server 101 incorporates therein a failover module 110. The failover module 110, which is one of the characteristics of this invention, includes the function of receiving a failure notification from the BMC 123, the function of controlling the power source through the BMC 123, the function of searching for the logic partition affected by a failure, the function of controlling the logic partitions configured by the logic partition module 120, and the function of controlling the disk mapping module 130 in the disk array device 103. The disk mapping module 130 in the disk array device 103 has a security function for restrictively selecting the server 102 capable of accessing a disk 131. The disk mapping module 130 serves to associate the HBA 121 installed in the server 102 with the disk 131. In this first embodiment of the invention, the server 102 uses the disk 131 in the disk array device 103 as a boot disk. The disk 131 stores therein an operating system OS and a task application.

In this embodiment, the term "server" is used to mean a "computer (physical computer)", and "failover" means that when a failure occurs in one of the servers, the process being executed and the data being used, in the faulty server are handed over to a substitutive/standby server. In this invention, however, the "failover" is used also to mean the function of handing over such a process as a task being executed in a logic partition and data, to a substitutive/standby server, not from necessity arising from the occurrence of a failure but due to a user's instruction.

Further in this embodiment, the term "logic partition" means the function of operating a single computer in such a manner as if it were composed of plural independent computers, and more specifically the function of running operating systems by so many logic partitions each of which is constituted of respective components, each one selected from among plural CPUs, memories, I/O devices, etc.

Figure 2:
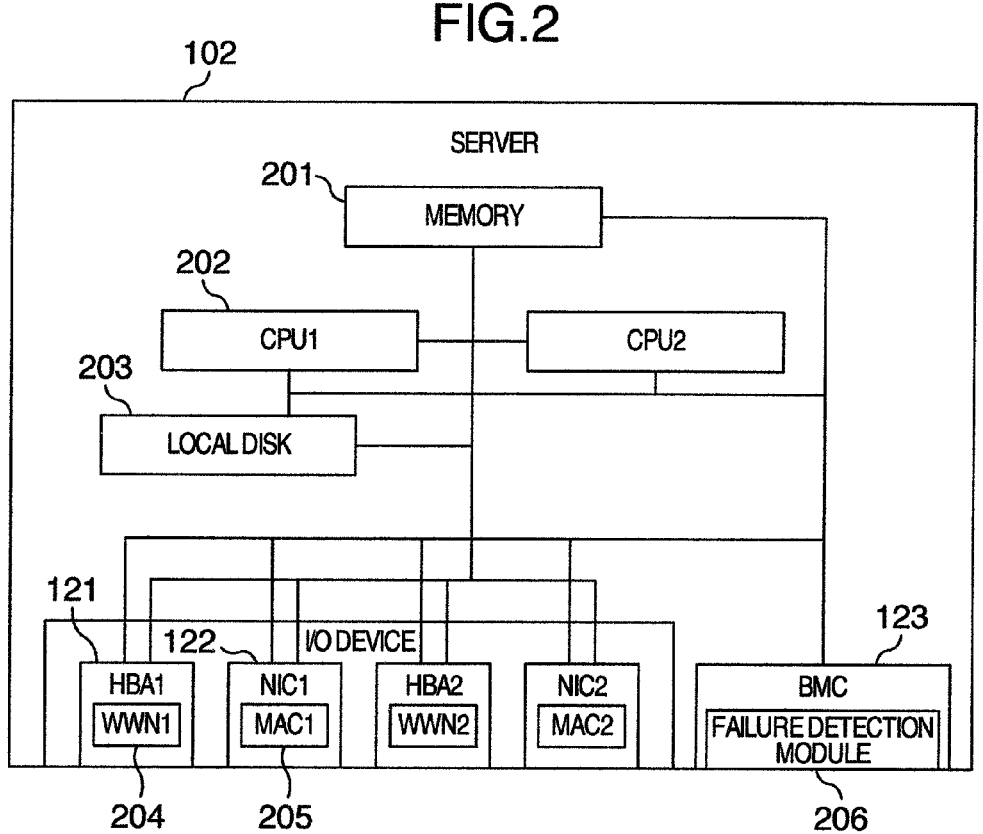
FIG. 2 shows the structure of a server.

FIG. 2 shows the detailed structure of a server 102 used in this embodiment. The server 102 comprises a memory 201 for storing programs and data, at least one CPU 202 for executing programs stored in the memory, an I/O device including at least one HBA 121 and at least one NIC 122, and a BMC 123. The HBA 121 incorporates therein a memory which stores a particular device identifier named "world wide name (MMN)" 204 that serves to identify the opposite party in the fiber channel communication. The BMC 123 mainly monitors and controls the hardware in the server 102. When a failure occurs in the hardware of the server 102, a failure detection module 206 can detect the failure and notify an external device of the failure. The power to the server 102 can be turned on and off remotely via the BMC 123.

Figure 3:
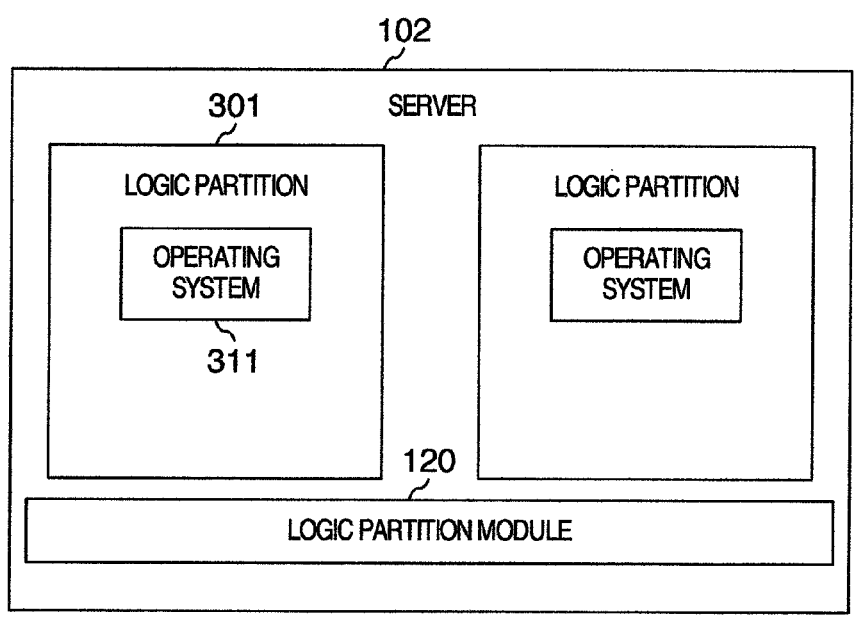
FIG. 3 shows the structures of logic partitions.

FIG. 3 shows the structures of logic partitions in the server 102 used in this embodiment. A logic partition module 120 is installed in the server 102, the logic partition module 120 can configure one or more than one logic partition 301 in the server 102, and the logic partition 301 can run an operating system 311. The logic partition module 120 may be a dedicated hardware or a program run by a CPU included in the server 102.

FIG. 4 shows the structure of the failover module 110 in the management server 101 shown in FIG. 1 and used in this embodiment. The failover module 110 comprises a server management table 401 for storing information on the configurations of the hardware and the partitions of the servers and on the status of servers being used, a server management function 405 for monitoring the statuses of servers and controlling the power to servers, a logic partition information table 402 for storing the list of logic partitions configured in the servers and the pieces of hardware used by the logic partitions, a logic partition management function 407 for controlling the logic partitions in the servers, an affected area search function 403 for searching for the logic partition affected by the failure when a failure occurs in the hardware, a server search function 406 for searching for a standby server which takes over the task at the time of failover operation being executed, and a disk mapping transfer function 404 for transferring the disk mapping from the faulty server to the standby server at the time of failover operation being executed. It is noted here that the functions performed by and the tables contained in, the failover module may be loaded down into the memory of the management server 101 so that the functions can be executed by the relevant CPUs, or that the functions and the tables are constituted with pieces of dedicated hardware.

FIG. 5 shows the detail of the server management table 401 shown in FIG. 4. The server management table 401 contains the list of servers managed by the failover module 110 and the servers' components and statuses in use. The column 501 of the table contains server identifiers. The server identifier 501 may be any piece of information that can identify each server, e.g. server serial number. The column 502 contains information on the CPUs. The column 521 within the column 502 indicates the number of CPUs installed in the associated server. The column 522 within the column 502 contains the identifiers of the CPUs installed in the associated servers. The CPU identifier 522 may be any piece of information that can identify each CPU, e.g. CPU slot number. In this embodiment, the minimum unit of the CPU information is an individual CPU. This, however, does not mean that the management unit is limited to an individual CPU. The management unit can be determined by considering the degree to which a failure can be detected or the allocation unit for logic partitioning. For example, an individual CPU core may be considered as another type of unit. The column 503 contains memory information. The column 531 within the column 503 contains the total capacity of memories installed in each server. The column 532 within the column 503 contains memory identifiers. The memory identifier 532 may be any piece of information that can identify every memory installed in each server, e.g. memory slot number. The column 533 within the column 503 contains the capacities of the respective memories. In this embodiment, the minimum unit of the memory information is an individual memory. This, however, does not mean that the management unit is limited to an individual memory. The management unit can be determined by considering the degree to which a failure can be detected or the allocation unit for logic partitioning. For example, an individual memory bank may be considered as another type of unit. The column 504 contains information on I/O devices for each server. The column 541 within the column 504 contains the MAC addresses of the NICs. The column 542 within the column 504 contains the WWNs of the HBAs.

In this embodiment, the I/O device information consists of the MAC address of the NIC in the column 541 and the WWN of the HBA in the column 542. This, however, does not mean that the I/O device information is represented solely by the NIC and the HBA. If a certain server incorporates therein another type of I/O device, the column 504 may contain the I/O device information associated with such an I/O device. The column 505 indicates the status of each server. If the status is "in use", the corresponding server is executing a task. If the status is "not in use", the server is ready to execute another task. The column 505 also contains information indicating the occurrence of a failure, denoted by "failure". The column 506 contains information indicating the location of a failure, which specifies which part of server is affected by the failure when the indication in the column 505 is "failure".

FIG. 6 shows the detail of the server management function 405 shown in FIG. 4. The server management function 405 monitors the status of server, that is, monitors the operating condition of, detects a failure occurring in, and controls the power supply to, each server. When a failure occurs in a certain server, the BMC 123 shown in FIG. 1 or the agent program executed by the server detects the occurrence of the failure and notifies the server management function 405 of the failure. The information on the failure thus notified includes the type of the failure. In order to determine whether the failover operation should be executed or not, the server management function 405 is provided with the failure operation table 601. The column 611 specifies the type of the failure occurring and the column 612 indicates whether or not the failover operation should be executed for the detected failure. The information to be contained in the failure operation table 601 may be arbitrarily chosen by the user of the system.

FIG. 7 shows the detail of the logic partition information table 402 shown in FIG. 4. The logic partition information table 402 contains the list of the logic partitions configured in the servers managed by the failover module 110 and the pieces of H/W used by those logic partitions. The column 701 contains server identifiers. These server identifiers are the same as the identifiers contained in the column 501 of the server management table shown in FIG. 5. The column 702 contains logic partition module identifiers. The column 703 contains logic partition identifiers. These identifiers are the registered ones which are used for the logic partition module to identify respective logic partitions. The column 704 indicates the number of the CPUs used by each logic partition. The column 705 contains CPU identifiers, which are the same as the identifiers contained in the column 522 of the server management table shown in FIG. 5. The column 706 indicates the memory capacity of each logic partition. The column 707 contains memory identifying information, which is the same as the group of memory identifiers contained in the column 532 of the server management table shown in FIG. 5. The column 708 indicates the I/O devices used by respective logic partitions. The column 781 contains the MAC addresses of the NICs and the column 782 the WWNs of the HBAs.

As exemplified in the table shown in FIG. 7, two logic partitions LPAR1 and LPAR2 exist in the server identified by the server identifier S1, and LPAR1 includes such hardware components as CPU1, Mem1, MAC1, and WWN1. Similarly, two logic partitions LPAR3 and LPAR4 exist in the server identified by the server identifier S2, and LAR3 includes such hardware components as two CPUs, three memories, two NICs, and two HBAs.

In the table shown in FIG. 7, no single hardware component such as CPU or I/O device is shared among plural logic partitions, but it is possible that more logic partitions than one can share, if necessary, a single hardware component. In such a case, more than one logic partition may be specified in the step (step 1104) described below of specifying the logic partitions affected by a failure.

Figure 8:
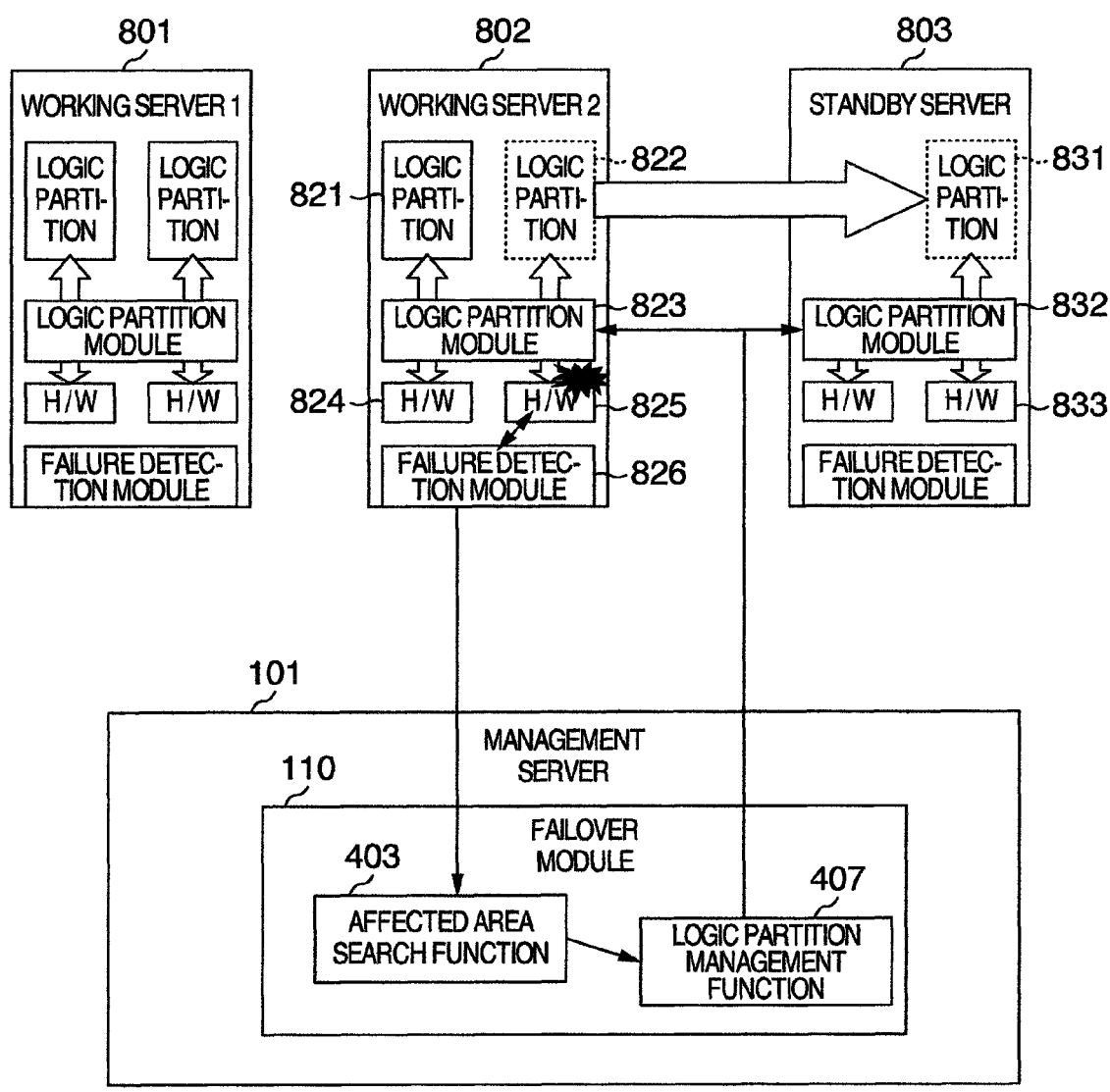
FIG. 8 diagrammatically shows how one logic partition is replaced by another in case of failover.

FIG. 8 shows an example of replacing one logic partition by another in case of failover. The working server 802 in which a failure occurred has a logic partition module 823 therein and the logic partition module 823 configures logic partitions 821 and 822. The logic partition 821 uses hardware H/W 824 and the logic partitions 822 uses hardware H/W 825. Each hardware may be dedicated to a single logic partition as shown in this embodiment, or some or all the pieces of hardware may be shared by different logic partitions. A standby server 803 has a logic partition module 832 therein. When a failure occurs in the hardware H/W 825 of the working server 802, a failure detection module 826 detects the failure and notifies the failover module 110 in the management server 101 of the failure. The failover module 110 starts the affected area search function 403 and specifies the logic partition which uses the hardware in which the failure has occurred. In FIG. 8, the logic partition 822 is specified as affected by the failure and the logic partition 822 is then transferred to the substitutive standby server 803. At this time, the failover module 110 causes the logic partition module 823 of the working server 802 to shut down the logic partition 822 and also causes the logic partition module 832 of the standby server 803 to configure in the standby server 803 a logic partition 831 which has the same hardware as the logic partition 822 used. Thus, the failover operation can be performed without shutting down the logic partition that does not use the hardware in which the failure has occurred.

Figure 9:
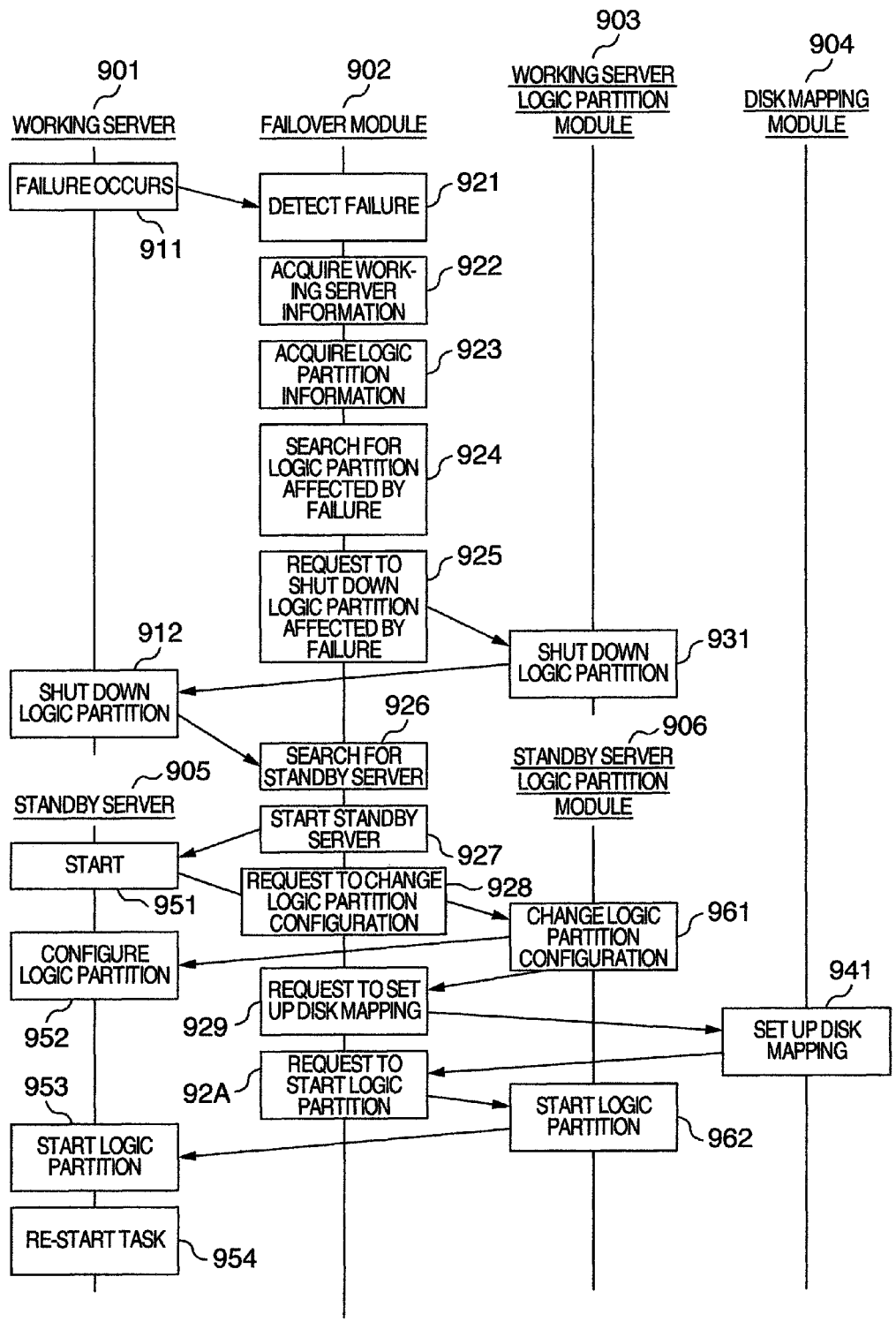
FIG. 9 is a sequence diagram for a first embodiment of this invention.

FIG. 9 is a sequence diagram for the first embodiment of this invention. This sequence diagram illustrates the interactions among a working server 901, a failover module 902, a logic partition module 903 in the working server 901, a disk mapping module 904, a standby server 905, and a logic partition module 906 in the standby server 905. Step 911 indicates the occurrence of a failure. The failure is detected by the BMC installed in or the agent program executed in, the server 901 and then the failover module 902 is notified of the failure. In step 921, the failover module 902 detects the notified failure. In step 922, the information on the hardware in the working server 901 is acquired from the server management table shown in FIG. 5. In step 923, the logic partition information is acquired from the logic partition information table shown in FIG. 7. In step 924, the logic partition affected by the failure is specified on the basis of the failure information notified in step 921, the server information acquired in step 922, and the logic partition information acquired in step 923. In step 925, the working server logic partition module 903 is requested to shut down the logic partition specified in step 924. Upon completion of steps 924 and 925, only the logic partition that is affected by the failure is shut down while the task being executed by the logic partition not affected by the failure can be continued without interruption. In step 931, the logic partition specified by the failover module 902 is shut down. When the operating system OS in the affected logic partition remains still working, the shutdown thereof is attempted. It is noted, however, that if the operating system OS is performing a dump process, it must not be shut down until the dump process has been finished.

It may also happen that the failover module 902 requests the server 901 to start the dump process. In step 912, the specified logic partition is shut down. If it is impossible to shut down the OS, then the logic partition module 903 executes the forcible shutdown of the logic partition. In step 926, a standby server that can take over the task is searched for on the basis of the server information acquired in step 922 and the logic partition information acquired in step 923. This search can be performed by using the server management table shown in FIG. 5 and the logic partition information table shown in FIG. 7 and by searching for a server in which a logic partition using the same H/W structure as the logic partition affected by the failure used, can be configured. The server found as a result of this search works as the standby server 905 and the logic partition module of the standby server 905 works as the standby server logic partition module 906. In step 927, the failover module 902 starts the standby server 905 so that a logic partition may be configured in the standby server 905. If the standby server 905 has already been started at this time, there is no need of executing step 927. In step 951, the standby server 905 is started. In step 928, the failover module 902 requests the standby server logic partition module 906 to change the configurations of logic partitions in the standby server 905. In step 961, the standby server logic partition module 906 starts changing logic partitions in the standby server 905. As a result, in step 952, a logic partition capable of using the same H/W structure as the logic partition affected by the failure used, is configured in the standby server 905. In step 929, the disk mapping for the logic partition affected by the failure is cancelled and the disk mapping module 904 is requested to set up an equivalent disk mapping for the logic partition configured in the standby server 905 in step 952. In step 941, the disk mapping module 904 of the disk array device executes the setup of the requested disk mapping so that the disk used previously by the working server 901 can be used in the standby server 905.

In order to boot the new logic partition configured in the standby server 905, which replaces the logic partition affected by the failure, the WWN of the HBA in the standby server replaces the WWN of the HBA in the server affected by the failure. In step 92A, the standby server logic partition module 906 is requested to start the logic partition configured in the standby server 905 in step 952. In step 962, the standby server logic partition module 906 starts the required logic partition. In step 953, the logic partition configured in step 952 is started. Consequently, the related OS and task application are also started to re-start the original task in step 954.

In FIG. 9, the standby server 905 is an independent server different from the working server 901. If, however, a logic partition capable of replacing the affected logic partition can be configured in the server 901, using other normal pieces of hardware in the server 901, then the failover operation can be performed within a single physical server, i.e. the server 901. In such a case, it is not necessary to boot an additional server and therefore to change the disk mapping.

The operational sequence shown in FIG. 9 will now be described in detail with reference to FIG. 10.

Figure 10:
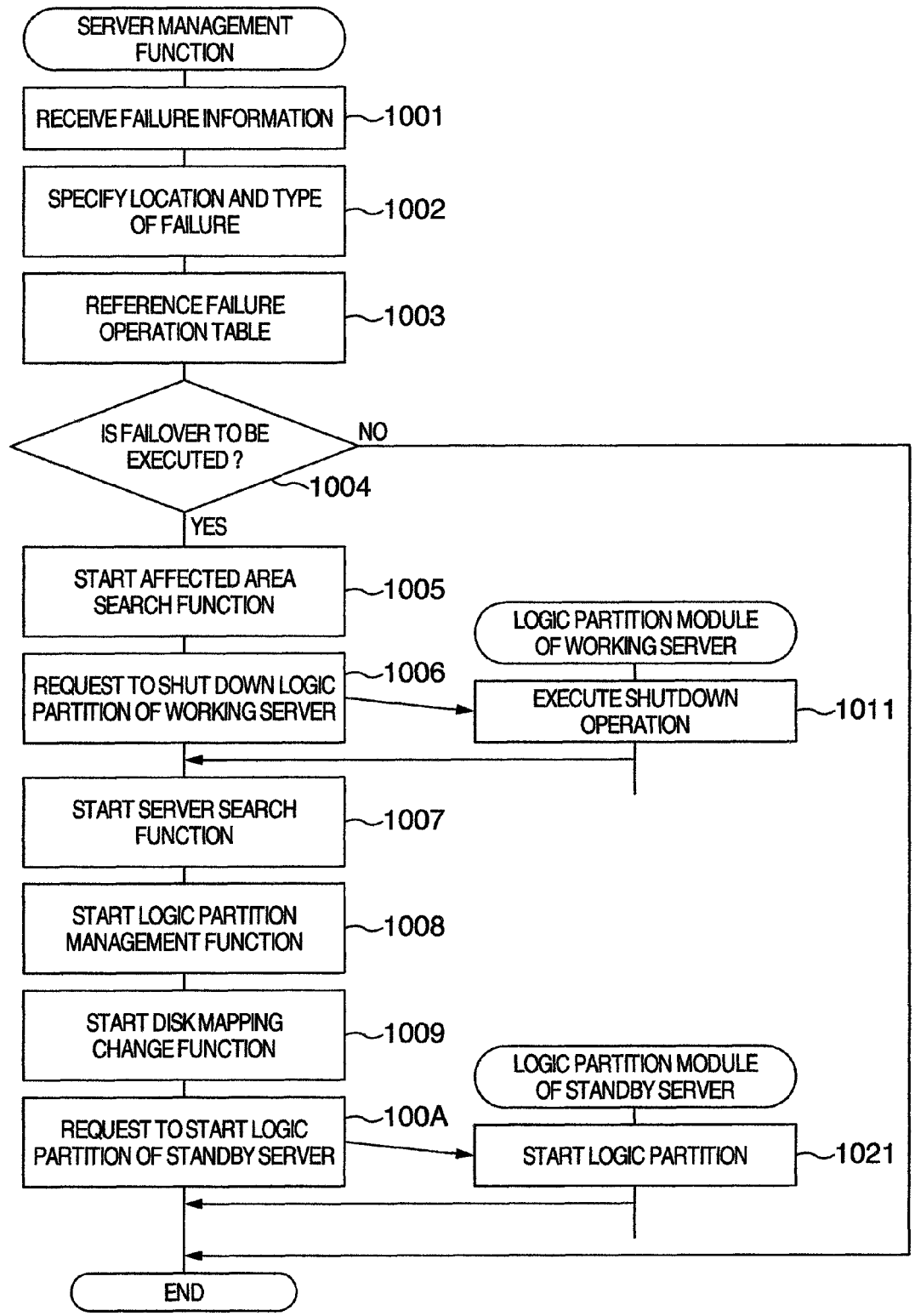
FIG. 10 is a process flow for a server management function.

FIG. 10 is a process flow for the server management function 405. In step 1001, the failure information is received from a server in which a failure has occurred. In step 1002, the location and the type of the failure are specified on the basis of the received failure information. In step 1003, the failure operation table is referenced to decide on whether or not the failover operation is to be executed for the specified type of failure. In step 1004, decision is made on whether the failover operation is to be executed or not. If the failover operation is necessary, step 1005 is followed, but if not necessary, nothing is done and the flow comes to the end. In step 1005, the affected area search function is started to specify the logic partition affected by the failure. This step is important because the task being executed by the unaffected logic partition must be continued without interruption. In the process flow to follow, the failover operation is performed only on the logic partition which has been specified as affected by the failure. Upon completion of the operation of the affected area search function, the flow is resumed at step 1006, in which the logic partition specified in step 1005 is requested to be shut down. In step 1011, the required logic partition is shut down. Upon completion of the shutdown operation, the flow proceeds to step 1007, in which the server search function is started to specify a substitutive standby server. Upon completion of the operation of the server search function, the flow proceeds to step 1008, in which the logic partition management function is started to configure in the standby server specified in step 1007 the same logic partition as that which was configured in the server in which the failure occurred. Upon completion of the execution of the logic partition management function, step 1009 is reached, in which the disk mapping change function is started to change the disk mapping in the logic partition of the affected server and that in the logic partition of the standby server. Upon completion of the execution of the disk mapping change function, step 101A is reached, in which the request is made to start the logic partition configured in the standby server in step 1008.

Figure 11:
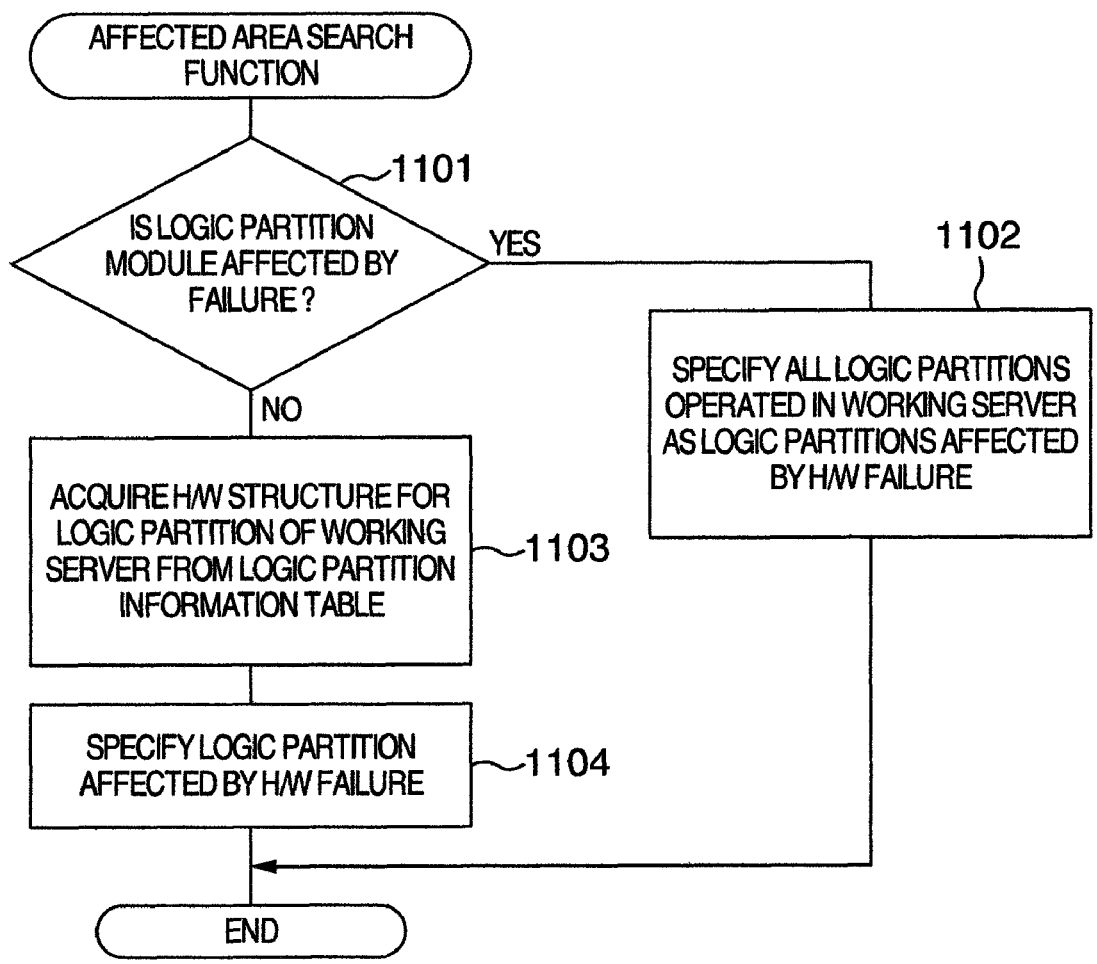
FIG. 11 is a process flow for an affected area search function.

FIG. 11 is a process flow for the affected area search function 403. In step 1101, decision is made on whether or not the logic partition module of the working server is affected by a failure. If the logic partition module is affected by the failure, the flow proceeds to step 1102. If the logic partition module is not affected by the failure, the flow proceeds to step 1103. In step 1102, all the logic partitions operated in the working server are specified as affected by the failure. In step 1103, the information on the logic partitions of the working server is acquired from the logic partition information table on the basis of the server identifier of the working server. In step 1104, the logic partition affected by the failure is specified. The information on the logic partitions acquired in step 1101 indicates which H/Ws are used by the respective logic partitions configured in the working server. By using this information and the information on the location of the failure received from the working server, the logic partition using the H/W in which the failure occurred, i.e. the logic partition affected by the failure, can be specified. If there is another logic partition using the affected H/W or if the affected area covers the cooling fan or the power supply unit, which are vital for the operation of the working server as a whole, then plural logic partitions are found as affected by the failure.

Figure 12:
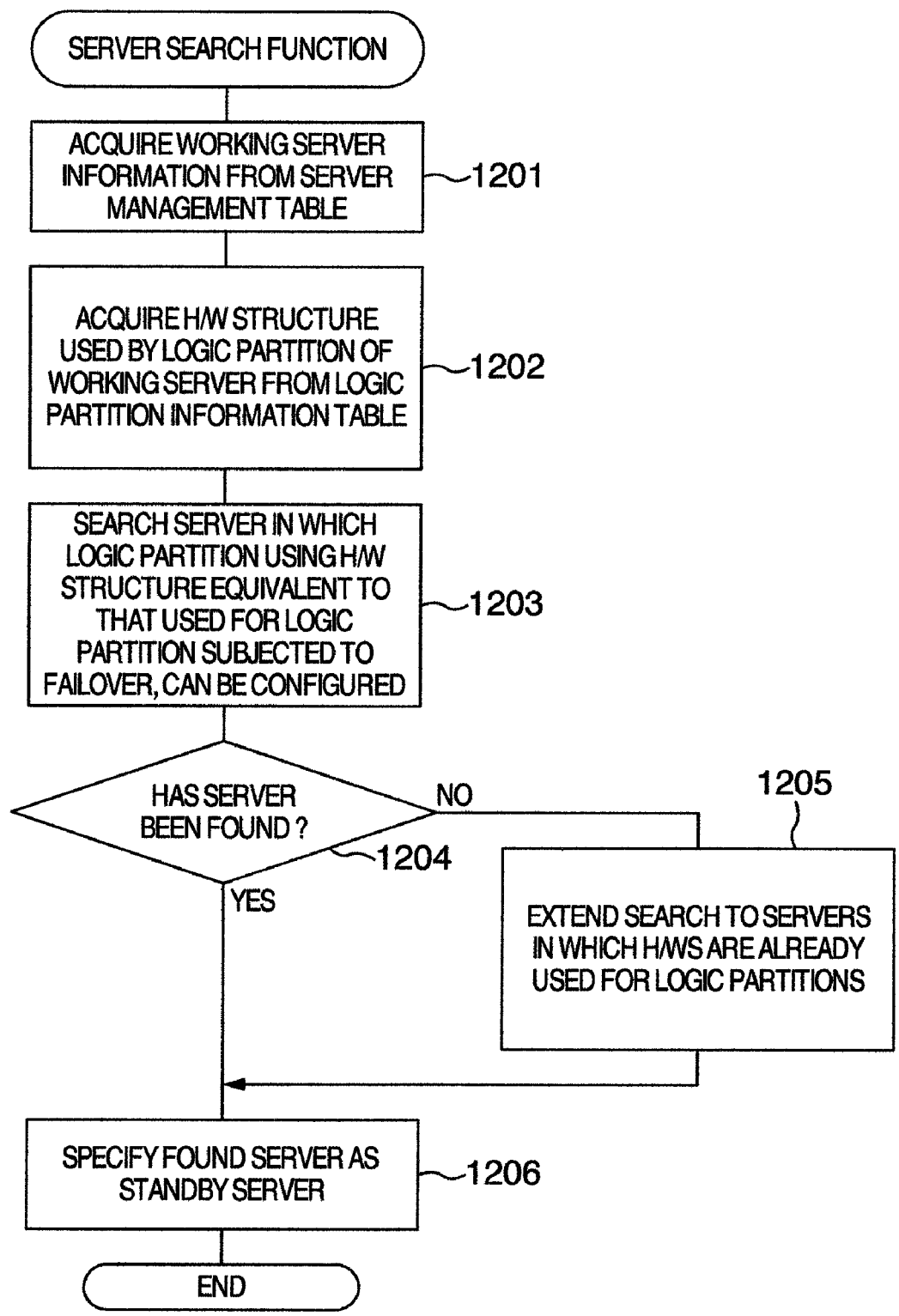
FIG. 12 is a process flow for a server search function.

FIG. 12 is a process flow for the server search function 406. In step 1201, the information on the working server is acquired from the server management table 401 on the basis of the server identifier of the working server. In step 1202, the information on the structure of the H/W used by the logic partition to be subjected to the failover operation is acquired from the logic partition information table 402 on the basis of the server identifier of the working server and the logic partition identifier of the logic partition to be subjected to the failover operation. The logic partition identifier of the logic partition to be subjected to the failover operation is the logic partition identifier specified by the affected area search function. In step 1203, search is made for a server wherein that logic partition can be configured which has the same configuration as the logic partition subjected to the failover operation. Here, a newly usable device which has not been used for any logic partition and which is not affected by the failure, is searched for on the basis of the information in the server management table and the information in the logic partition table. By comparing the thus obtained information with the information on the structure of the H/W used by the logic partition subjected to the failover operation, search is made for a server having the unused and newly usable device equivalent to the H/W structure used by the logic partition subjected to the failover operation. Here, the term "H/W structure" signifies the combination of the number of CPUs, the memory capacity, and the I/O device. In step 1204, decision is made on whether the required server has been found or not. If such a server cannot be found, step 1205 is reached, in which an extensive search is made, by using the information on H/Ws already in use for other logic partitions, for a server in which the same logic partition as the logic partition subjected to the failover operation can be configured. The server found as a result of this search can work as a standby server. In step 1206, the server found in step 1203 or 1205 is specified as the required standby server. If plural servers satisfying the required condition have been found as a result of executing step 1203, one of the found servers is arbitrarily selected. In the arbitrary selection of the server, it is possible to set up some rules according to a user's previous requirements.

For example, it is considered to give priority in selection to a server that has no H/W affected by a failure in order to execute a task by a server with higher security, to a server that is not executing a task in order to increase operating efficiency by decentralizing processes, or to a server that is already in operation in order to decrease power consumption. Further, if there exist plural logic partitions that are affected by a failure and if there are not enough number of standby servers to which the configurations of all the affected logic partitions are transferred through failover operation, then it is possible, in selecting logic partitions subjected to failover operation, to previously set up some rules according to a user's prior consideration. For example, it may be possible to establish priority among logic partitions and prioritize the logic partitions with higher priority in failover operation, or to select a particular set of logic partitions so that the maximum number of logic partitions can be subjected to the failover operation. Further, if an inter-blade SMP configuration is employed, the plural blades appear as if they constitute a single blade. In such a case, it is possible to centralize separate logic partitions in a single blade at the time of failover to build a constitution for achieving a higher process speed.

In case of establishing priority to logic partitions, a column indicating the degree of priority is added to the logic partition information table 402 and a user sets up the provision of priority to logic partitions at the time of, for example, system buildup.

Figure 13:
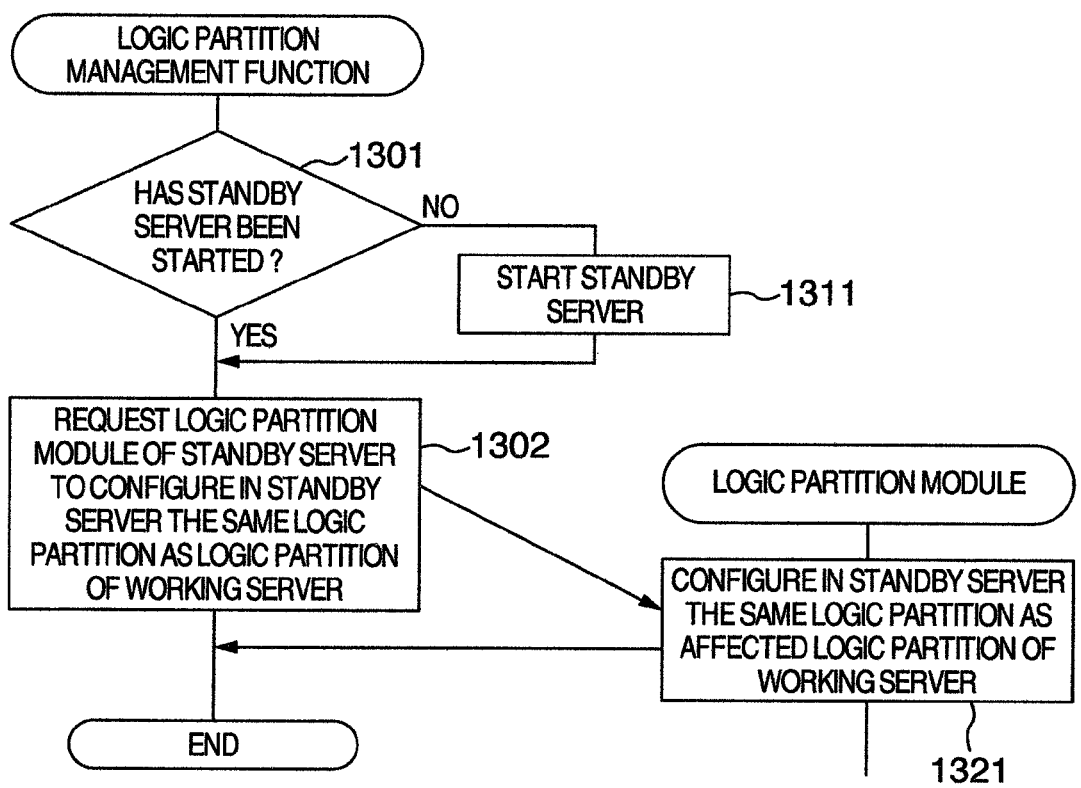
FIG. 13 is a process flow for a logic partition management function.

FIG. 13 is a process flow for the logic partition management function 407. In step 1301, decision is made on whether the standby server has been started or not. Here, the standby serve is that which has been selected in step 1205 in FIG. 12. If the standby server has been started, step 1302 is reached. If the standby server has not yet been started, the flow proceeds to step 1311, in which the standby server is started. This is to start the logic partition of the standby server. The standby server can be started through the BMC thereof. In step 1302, request is made for the logic partition module of the standby server to configure in the standby server the same logic partition as the logic partition subjected to failover. In step 1321, the logic partition module of the standby server configures a logic partition having a required configuration in the standby server.

Embodiment 2

In this second embodiment of the invention, an example is illustrated wherein the failover operation is performed at a time other than the occurrence of a failure. Cases other than the occurrence of a failure may include an instruction by a user such as an administrator or a maintainer, a command from a program according to a predetermined schedule, etc. The purpose of such an additional case is, for example, to provide maintenance such as the updating of the firmware of the server.

Figure 22:
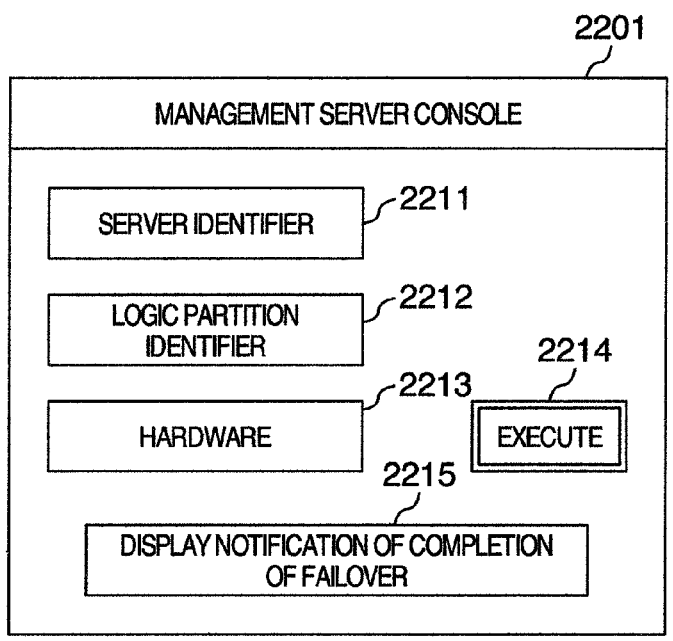
FIG. 22 shows an example of the screen of the management server console for the second embodiment of this invention.

FIG. 22 shows an example of the screen of the management server console for the second embodiment of this invention. The management server console 2201 is an aggregation of interfaces which perform failover operation according to, for example, a user's instruction. The management server console 2201 comprises an interface 2211 for selecting or receiving server identifiers, an interface 2212 for selecting or receiving logic partition identifiers, an interface 2213 for selecting or receiving information on pieces of hardware, an interface 2214 for initiating the execution of failover, and an interface 2215 for notifying the completion of failover. The subject of failover operation is specified by the interfaces 2211, 2212 and 2213. In the case where a particular hardware is maintained, the hardware to be maintained and the associated server identifier may be specified and the logic partition using that hardware may be subjected to failover. Further, in case of subjecting a particular logic partition to failover, the associated server identifier and the associated logic partition identifier may be specified, or only the server identifier may be specified when a server is subjected to failover.

Another use of the management server console is, for example, to subject the logic partition affected by the failure to a failover operation after the occurrence of a failure and thereafter to cause the standby server to take over all the other logic partitions executing tasks in the affected server so as to maintain the affected server, as described above in the first embodiment of the invention. In such a case, it is necessary to notify the user of which logic partitions remain executing tasks and to provide an interface to allow the user to specify the logic partition subjected to the failover.

The execution of a failover operation is initiated by the interface 2214. As soon as the execution of the failover operation is initiated by the interface 2214, a pseudo-failure is generated and the failover operation is executed. Upon completion of the execution of the failover operation, the interface 2215 is notified of the completion. The content of the notification can include the logic partition subjected to the failover, the success or failure in the failover, and so on. The execution of the failover operation can be initiated not only by a graphical user interface (GUI) as in FIG. 22, but also by another type interface such as, for example, a command line interface (CLI).

Figure 23:
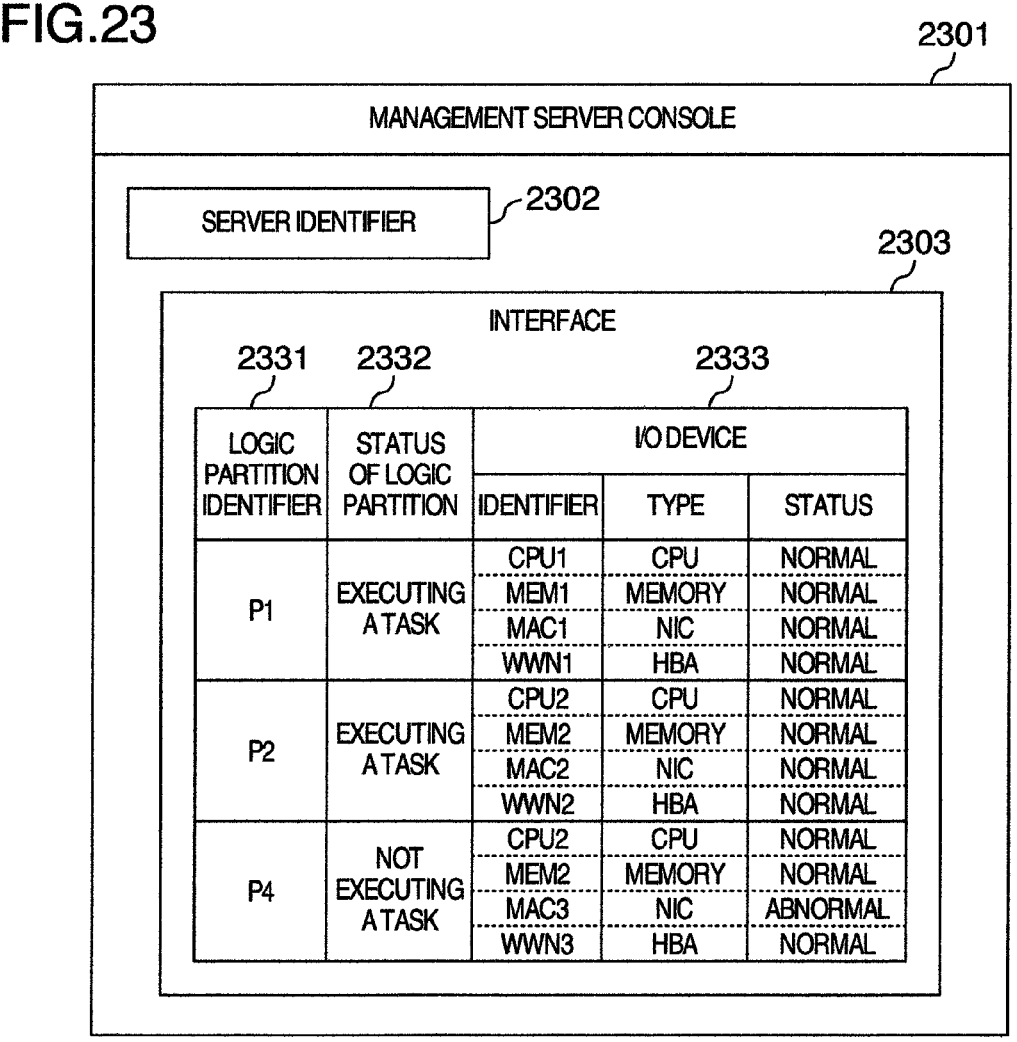
FIG. 23 shows an example of the management server console for the second embodiment of this invention, displaying the server structure.

FIG. 23 shows an example of the management server console for the second embodiment of this invention, displaying the server structure. The management server console 2301 is an interface used for displaying the server structure. The management server console 2301 comprises an interface 2302 for selecting or receiving a server identifier and an interface 2303 for displaying the structure of the selected server. The interface 2303 displays the server structure consisting of the logic partition identifier contained in the column 2331, the status of the logic partition contained in the column 2332 and the I/O device contained in the column 2333. These pieces of information may be employed as reference used for the execution of failover due to a user's instruction.

Figure 14:
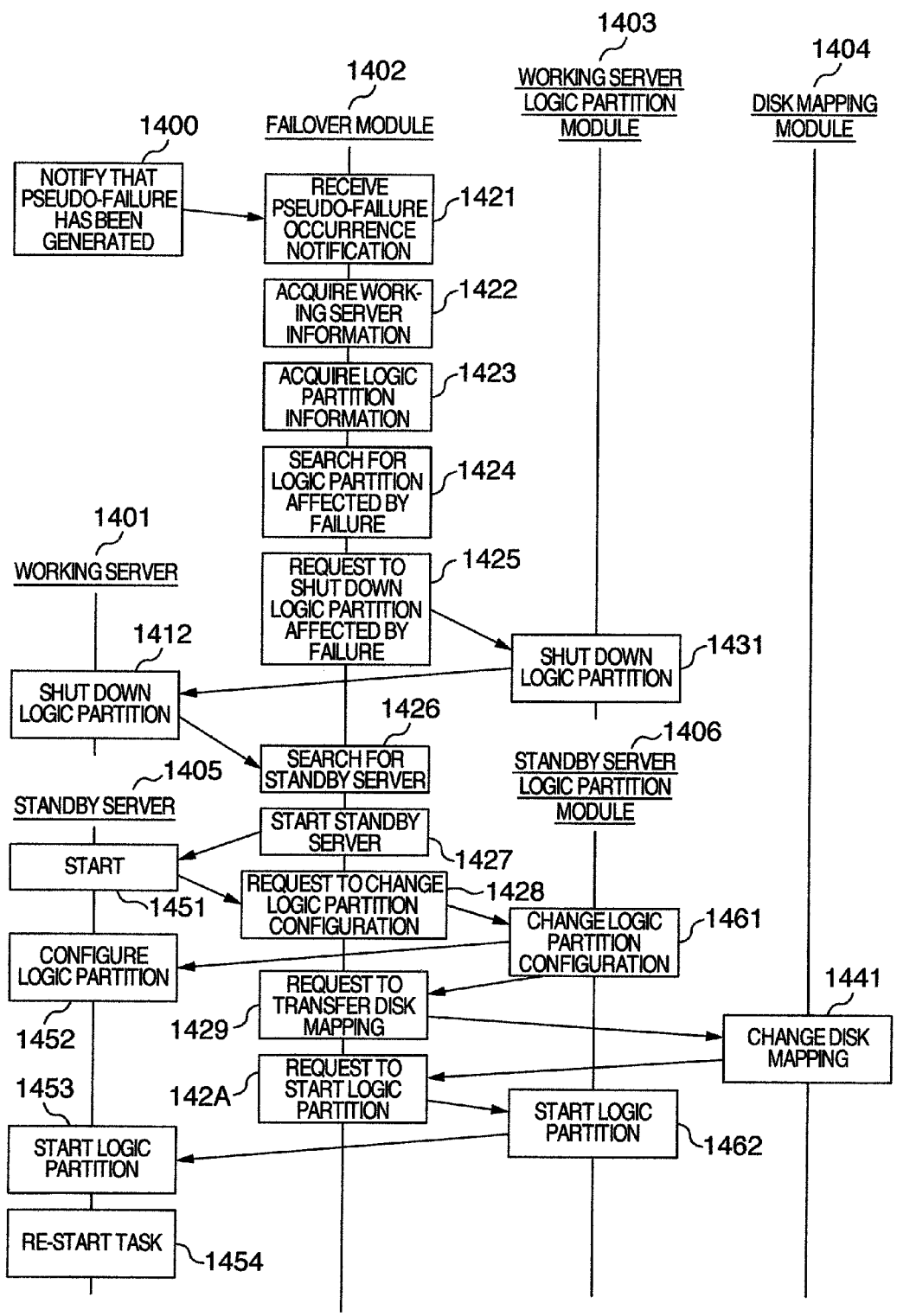
FIG. 14 is a sequence diagram for a second embodiment of this invention.

FIG. 14 is a sequence diagram for the second embodiment of this invention. The difference of this embodiment from the first embodiment is that the failover operation is executed in accordance with the occurrence of a pseudo-failure due to, for example, a user's instruction 1400, but not in time with the occurrence of an actual failure. In this second embodiment, the failover operation is executed according as the location of the failure is specified in step 1400.

Figure 15:
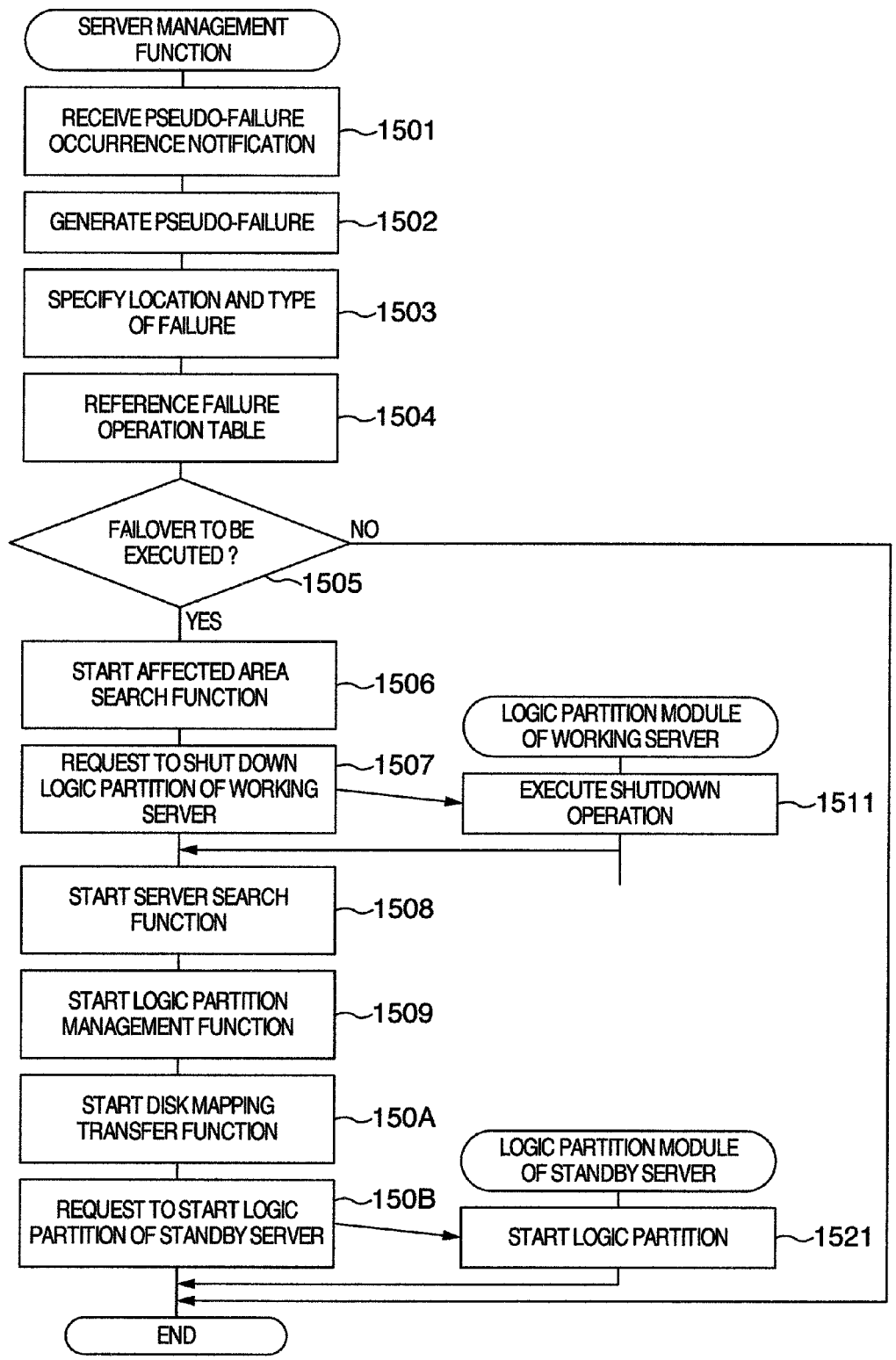
FIG. 15 is a process flow for a server management function.

FIG. 15 is a process flow for the server management function in the second embodiment. The difference of this process flow from that shown for the first embodiment in FIG. 10 is that the flow starts in time with the reception of a pseudo-failure notification in step 1501 and that a pseudo-failure is generated in step 1502. The information on the location where the pseudo-failure has occurred is acquired from the pseudo-failure notification received in step 1501.

As described above in the first embodiment, after the logic partition affected by a failure in a working server has been taken over by a standby server, one or some logic partitions in the working server sometimes remain still executing their tasks. In such a case, the working server affected by the failure can be maintained or the program loaded in the affected working server can be updated, if different servers other than the standby server take over the logic partitions executing their tasks by using the above mentioned interfaces in accordance with a user's instruction. This is an advantage of this embodiment. Moreover, this embodiment has another advantage that if maintenance is desired to replace a particular hardware, such maintenance can be realized by specifying the particular hardware, searching for the logic partition using the specified hardware, specifying the desired logic partition, and transferring the specified logic partition to a different server.

Embodiment 3

The third embodiment of this invention exemplifies a case where after the completion of the failover of a logic partition affected by a failure, other logic partitions that have not been affected by the failure are transferred to a standby server. A "relocation-during-execution" technique may be employed, if possible, to transfer the other unaffected logic partitions to the standby server while they are continuously executing their tasks. Thus, all the logic partitions configured in the working server can be transferred to the standby server without interrupting the tasks being executed by the unaffected logic partitions. In this way, it is possible, for example, to turn off the power supply to the working server so that the faulty hardware can be maintained safely. The above mentioned, "relocation-during-execution" technique is meant to be an artifice for re-configuring the logic partitions in a working server executing their programs in another physical server, i.e. standby server, without interrupting the execution of the programs.

Figure 16:
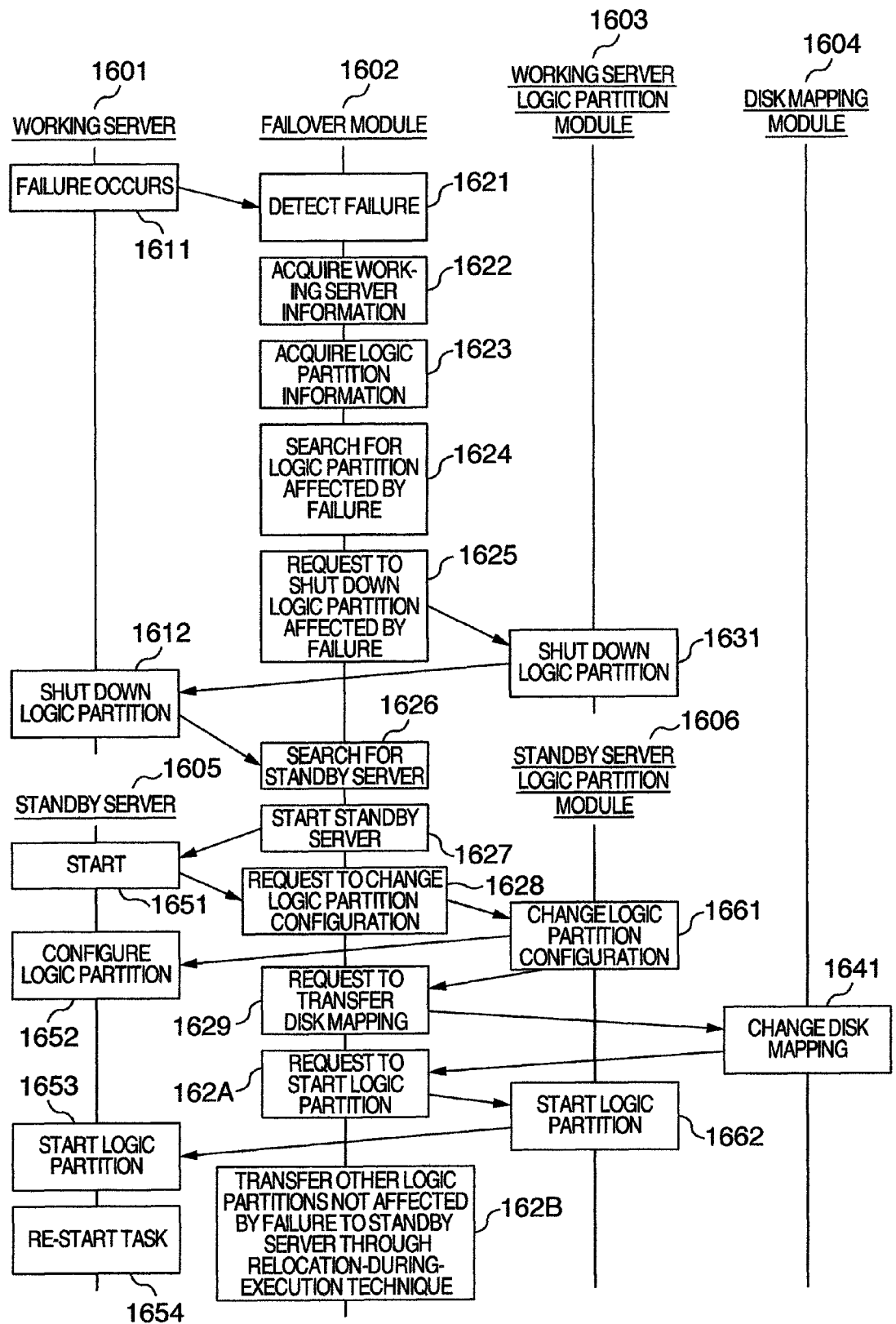
FIG. 16 is a sequence diagram for a third embodiment of this invention.

FIG. 16 is a sequence diagram for the third embodiment of this invention. As shown in FIG. 16, only the difference of the third embodiment from the first embodiment is the addition of step 162B to the sequence diagram shown for the first embodiment in FIG. 9. In step 162B, the other logic partitions that are not affected by a failure are transferred to a standby server by means of the "relocation-during-execution" technique.

FIG. 17 shows a logic partition information table used in the third embodiment of this invention. This table differs from the table shown for the first embodiment in FIG. 7 only in the addition of the column 1709. The column 1709 indicates whether or not the "relocation-during-execution" technique is supported, that is, can be used.

Figure 18:
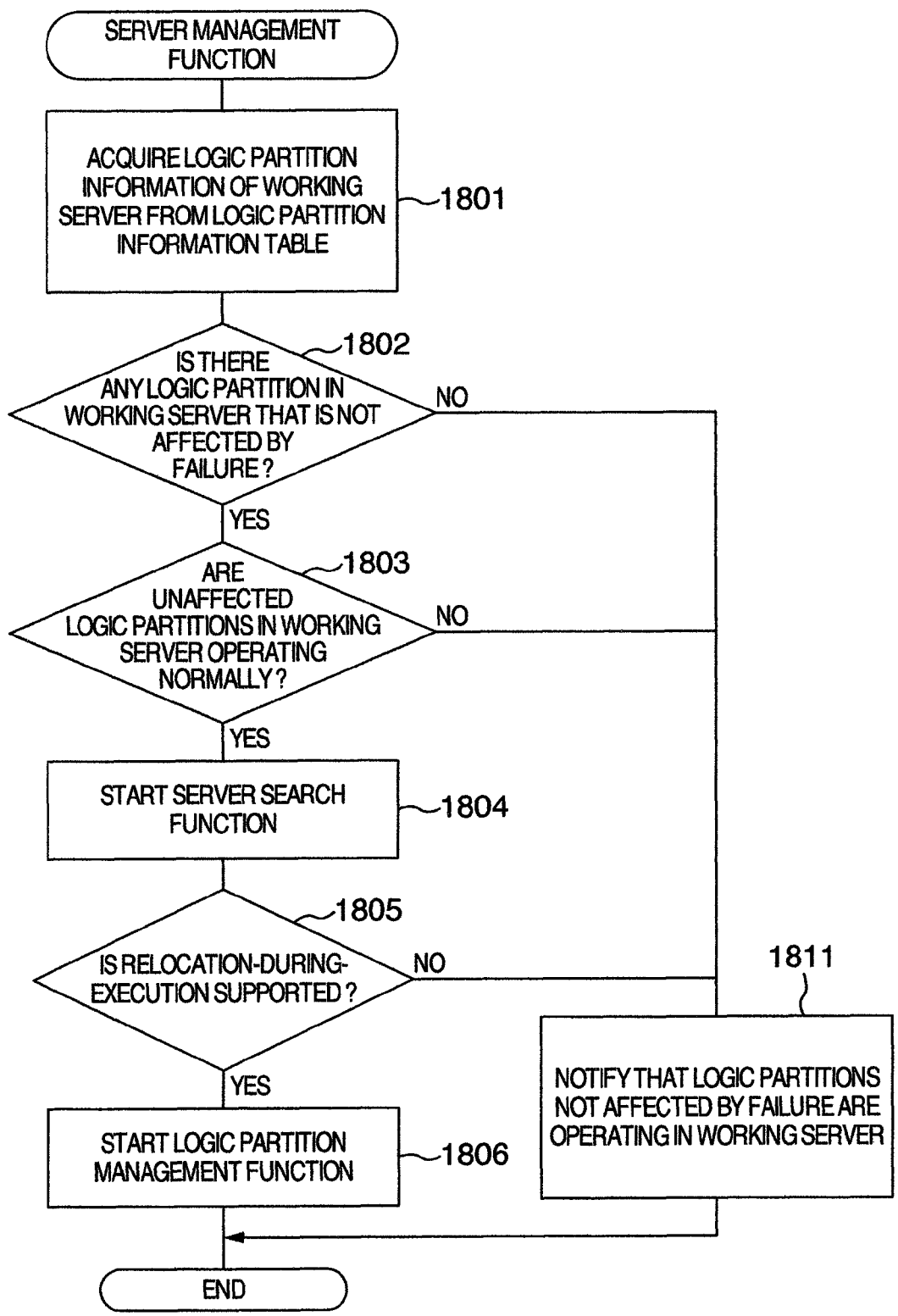
FIG. 18 is a process flow for a server management function.

FIG. 18 is a process flow for the server management function executable in step 162B in FIG. 16. In step 1801, the logic partition information of the working server is acquired from the logic partition information table. In step 1802, decision is made on whether there are in the working server the logic partitions that are not affected by the failure, on the basis of the information acquired in step 1801. If there are not unaffected logic partitions, step 1811 is reached. If there are unaffected logic partitions, the flow proceeds to step 1803, in which decision is made on whether the unaffected logic partitions are operating normally. If the unaffected logic partitions indicate that the execution of their agent program is abnormal, or if they cannot communicate with the agent program, then it is deemed that the relocation-during-execution technique cannot be employed. As a result, step 1811 is reached. If the unaffected logic partitions are operating normally, the flow proceeds to step 1804, in which the server search function is started to search for a standby server. The process flow for the server search function mentioned here is the same as that shown for the first embodiment of this invention in FIG. 12. In step 1805, decision is made on whether the logic partitions in the working server in which a failure occurred and the logic partitions in the standby server can support the relocation-during-execution technique. If they cannot support the technique, step 1811 is reached. If they support the technique, the flow proceeds to step 1806, in which the logic partition management function is started to perform the relocation-during-execution. Upon completion of the relocation-during-execution, the flow comes to the "End". Step 1811 is reached when the relocation-during-execution is impossible. In such a case, the administrator is notified of the fact that logic partitions not affected by the failure are still operating in the working server. The way of notification may include sending an E-mail to a predetermined address or displaying a message on the screen of the management server console.

Figure 19:
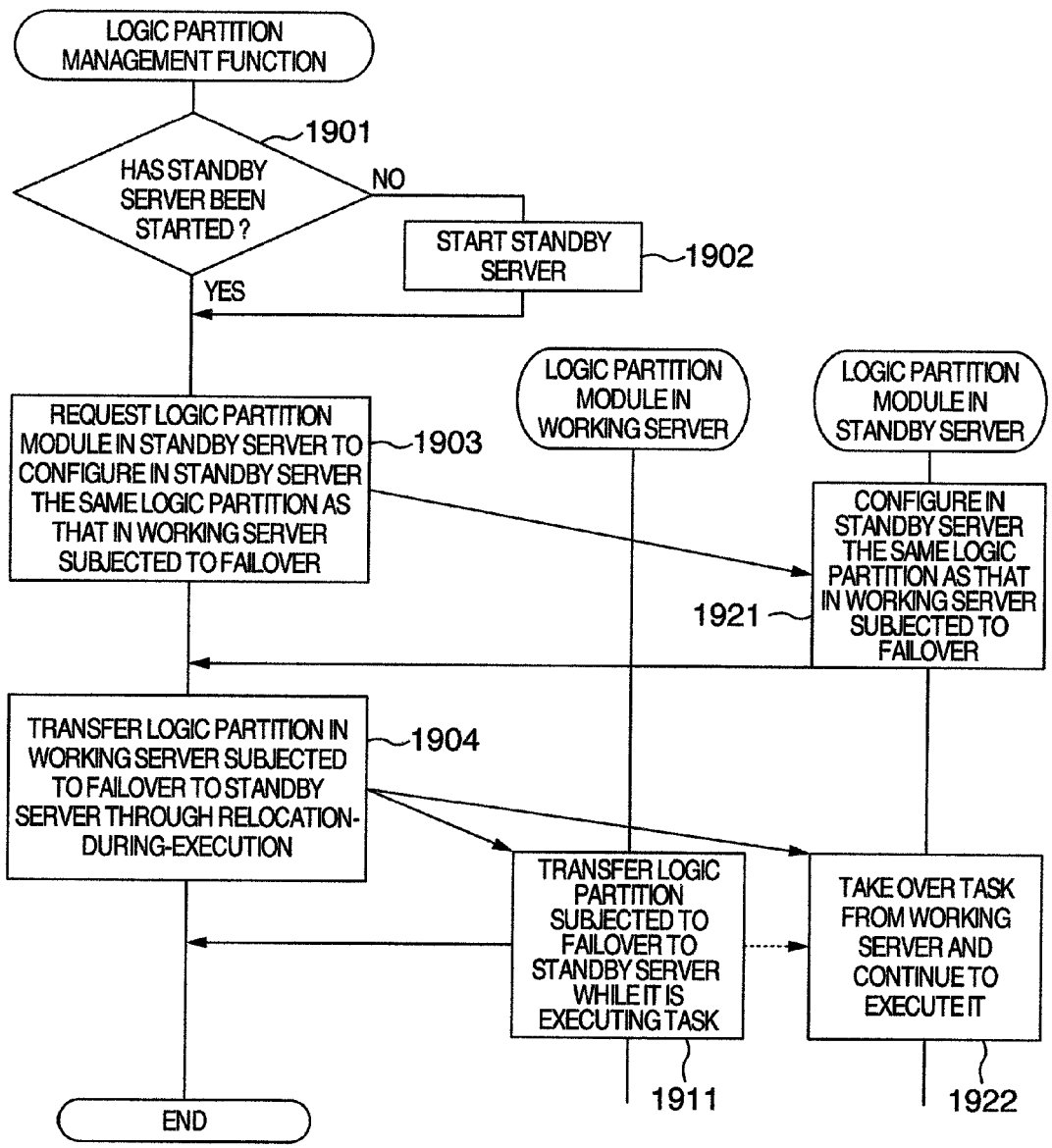
FIG. 19 is a process flow for a logic partition management function.

FIG. 19 is a process flow for the logic partition management function used in the third embodiment of this invention. In step 1901, decision is made on whether the standby server has been started. If the standby server has not yet been started, step 1902 is reached to start the standby server. Accordingly, the logic partition module in the standby server gets prepared for operation. In step 1903, the logic partition module in the standby server is requested to configure in the standby server the same logic partition as the logic partition in the working server subjected to failover. In step 1921, the same logic partition as the logic partition in the working server subjected to failover is configured in the standby server. In step 1409, the logic partition module in the working server in which a failure occurred and the logic partition module in the standby server are requested to perform the relocation-during-execution. In steps 1911 and 1922, the relocation-during-execution is performed. Consequently, the tasks being executed by the logic partitions that are not affected by the failure are taken over without interruption by the standby server.

This third embodiment of this invention is advantageous in that a logic partition incapable of continuing to execute its task due to the influence of a failure is failovered to a standby server through boot disk handover technique and that the other logic partitions which are not affected by the failure are transferred to the standby server while they are continuously executing their tasks, through the use of the relocation-during-execution technique. In this way, all the logic partitions of the working server in which the failure has occurred can be transferred to the standby server without shutting down the logic partitions that are not affected by the failure. Accordingly, the working server in which the failure occurred can be shut down and the maintenance operation can be performed safely. Consequently, even when a failure occurs in a server in operation, a failover operation with high usability can be performed.

Embodiment 4

The fourth embodiment of this invention exemplifies a case where a logic partition affected by a failure and other logic partitions related to the affected logic partition are all subjected to failover. FIG. 20 shows a logic partition information table for the fourth embodiment of this invention. This table shown in FIG. 20 differs from the similar table provided for the first embodiment of this invention and shown in FIG. 7, in the addition of columns 2009, 2091 and 2092. The column 2009 contains the information on the related logic partitions. The column 2091 contains the server identifiers for the related logic partitions and the column 2092 contains the logic partition identifiers of the related logic partitions. The information on the related logic partitions is registered according to a user's previous setup. In this embodiment, the information on the related logic partitions is represented by the server identifiers and the logic partition identifiers. However, another representation may also be possible wherein a single identifier is allocated to a set of logic partitions related to an affected logic partition.

Figure 21:
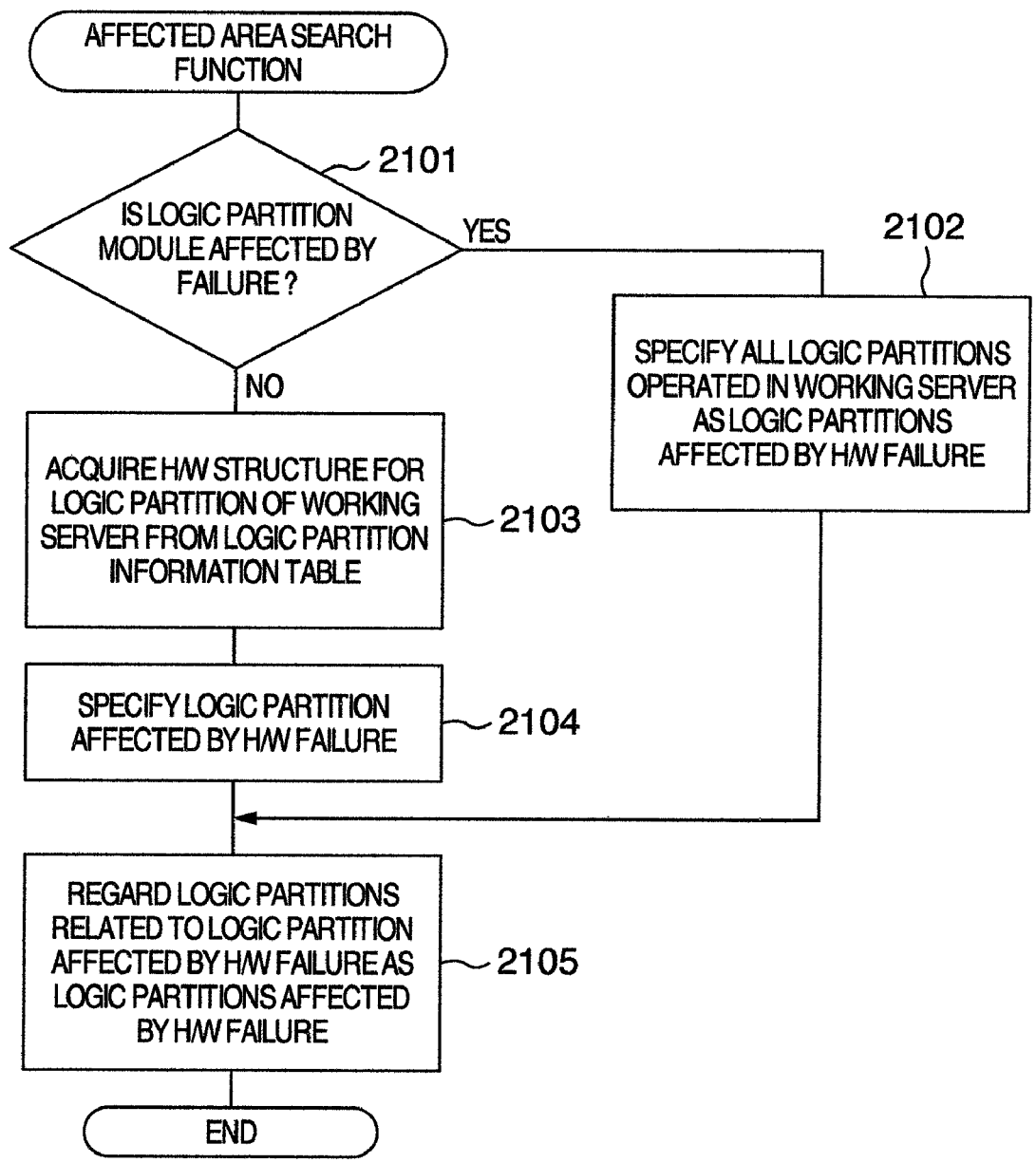
FIG. 21 is a process flow for an affected area search function.

FIG. 21 is a process flow for an affected area search function used in this fourth embodiment. This flow shown in FIG. 21 differs from the similar process flow provided for the first embodiment and shown in FIG. 11, in the addition of step 2105. In step 2105, a logic partition affected by a failure and other logic partitions related to the affected logic partition are specified on the basis of the information contained in the column 2009 of the logic partition information table, and the other logic partitions related to the affected logic partition are regarded also as affected by the failure.

In this embodiment, description is made mainly of logic partitions, but it is possible to replace the "logic partition" by "virtual server (computer)".

This invention provides a method for failover wherein when a failure occurs in a server which is booted by an external disk device and which configures therein at least one logic partition by the use of a logic partition division technique, the takeover of tasks is realized by the takeover of boot disk, and wherein the logic partition affected by the failure is specified and the affected logic partition alone is subjected to failover, so that the tasks executed by the logic partitions not affected by the failure can be continuously executed without interruption.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A failover method for use with a computer system in which the operating systems are booted by an external disk device, wherein plural servers are connected via a network to the external disk device, each of the servers incorporates therein a logic partition module for configuring at least one logic partition in each server, and a task being executed by a working server in the computer system is taken over by a standby server in the computer system when a failure occurs in the working server, the method comprising a step of detecting the failure that has occurred in the working server;

a step of specifying the location of the failure;

a step of specifying the logic partition that is affected by the failure, depending on the specified failure location;

a step of shutting down the logic partition;

a step of searching for a standby server for taking over the task from the working server in which the failure occurred;

a step of configuring in the standby server a logic partition equivalent to the logic partition affected by the failure;

a step of establishing the correspondence relationship between the logic partition configured in the standby server and the external disk device for booting the operating systems in logic partitions; and a step of starting the configured logic partition, wherein the step of specifying the logic partition that is affected by the failure detects whether or not the failure affects the logic partition module; and if the logic partition module is affected by the failure, all the logic partitions in the working server are regarded as affected by the failure.

2. A failover method as claimed in claim 1, wherein in the step of establishing the correspondence relationship between the logic partition configured in the standby server and the external disk device for booting the operating systems in logic partitions, the standby server has plural disk adapters therein; the disk adapter identifier allocated to the affected logic partition is identified as the disk adapter identifier allocated to the configured logic partition.

3. A failover method as claimed in claim 1, wherein if there are plural logic partitions that are affected by the failure and if there is not a server to which all the affected logic partitions can be transferred through failover operation, those logic partitions among all the affected logic partitions which have higher priority are subjected to failover operation.

4. A failover method as claimed in claim 1, wherein if there is not a standby server in which a logic partition equivalent to the affected logic partition can be configured, the step of searching for a standby server causes a server already allocated to other logic partitions to be specified as the standby server.

5. A failover method as claimed in claim 1, wherein an interface is incorporated to receive the instruction for subjecting the unaffected logic partitions to the failover operation after the affected logic partition has been transferred through the failover operation; the unaffected logic partitions are taken over by a standby server; and the interface is notified of the completion of takeover after the standby server has taken over the unaffected logic partitions.

6. A failover method as claimed in claim 1, wherein if there are other logic partitions related to the affected logic partition, the step of specifying the affected logic partition causes the other logic partitions related to the affected logic partition to be specified also as affected by the failure.

7. A failover method as claimed in claim 1, wherein there are unaffected logic partitions other than the affected logic partition, in the working server in which the failure occurred; and the logic partition module of the faulty working server has the relocation-during-execution function for transferring logic partitions to a standby server while they are executing tasks, the method further comprising a step of transferring the unaffected logic partitions to the standby server.

8. A failover method as claimed in claim 1, wherein there are unaffected logic partitions other than the affected logic partition, in the working server in which the failure occurred; the logic partition module of the faulty working server does not have the relocation-during-execution function for transferring logic partitions to a standby server while they are executing tasks; and the fact is notified that the unaffected logic partitions are executing their tasks in the faulty working server.

9. A failover method as claimed in claim 1, wherein the step of shutting down the affected logic partition is executed after the completion of the process of dumping for the affected logic partition.

10. A computer system in which the operating systems are booted by an external disk device, wherein plural computers are connected via a network to the external disk device; each of the plural computers incorporates therein a logic partition module for configuring at least one logic partition in each computer; at least one of the plural computers has a failover module for transferring a task being executed by a working computer to another computer when a failure occurs in the working computer; and the computer includes a process unit for detecting the occurrence of the failure and a process unit for specifying the location of the failure; the failover module comprising a process unit for specifying logic partitions affected by the failure;

a process unit for shutting down the affected logic partitions;

a process unit for searching for a standby computer which takes over a task from the working computer in which the failure occurred;

a process unit for configuring in the standby computer a logic partition equivalent to the affected logic partition;

a process unit for establishing the correspondence relationship between the logic partition configured in the standby server and the external disk device for booting the operating systems in logic partitions; and a process unit for starting the configured logic partition, wherein the process unit which specifies the logic partition that is affected by the failure detects whether or not the failure affects the logic partition module; and if the logic partition module is affected by the failure, all the logic partitions in the working server are regarded as affected by the failure.

11. A computer system as claimed in claim 10, wherein the computer is provided with a user interface and a process unit for specifying particular logic partitions to be transferred to other standby servers in accordance with the instruction from the user interface for subjecting the particular logic partitions to a failover operation; and a logic partition equivalent to the specified logic partition is configured in the standby server.

12. A computer system as claimed in claim 10, wherein the failover module is provided with information designating whether or not the plural computers are capable of the relocation-during-execution operation; the computer system further comprising a process unit for executing the process of transferring the unaffected logic partitions to another computer if the affected computer and the standby computer are both provided with the relocation-during-execution function.

13. A computer system as claimed in claim 10, further comprising a process unit for previously defining logic partitions related to the logic partition affected by the failure and transferring the related logic partitions and the affected logic partition to the standby server through the failover operation.

14. A computer system as claimed in claim 10, wherein if there are plural logic partitions affected by the failure, the process unit for specifying logic partitions affected by the failure causes a logic partition information storing means to store information representing logic partitions with high priority; the computer system further comprising a process unit for giving priority to the affected logic partitions in accordance with the information.

15. A failover method for a computer system wherein a working server incorporates therein a logic partition module for configuring at least one logic partition in the working server; and if a failure occurs in the working server, the task being executed in the working server is taken over by a standby server in the computer system; the failover method comprising a step of detecting the failure occurring in the working server;

a step of specifying the location of the failure;

a step of specifying a logic partition affected by the failure depending on the specified failure location;

a step of shutting down the affected logic partition;

a step of searching for a standby server which takes over the task being executed by the faulty working server;

a step of configuring in the standby server a logic partition equivalent to the affected logic partition; and a step of causing the configured logic partition to take over the task, wherein the step of specifying the logic partition that is affected by the failure detects whether or not the failure affects the logic partition module; and if the logic partition module is affected by the failure, all the logic partitions in the working server are regarded as affected by the failure.

16. A failover method as claimed in claim 15, wherein the step of shutting down the affected logic partition shuts down the affected logic partition after the completion of the process of dumping for the affected logic partition.

* * * * *